United States Patent [19]
Lee et al.

[11] Patent Number: 5,059,836
[45] Date of Patent: Oct. 22, 1991

[54] DIFFERENTIAL-TIME-CONSTANT BANDPASS FILTER USING THE ANALOG PROPERTIES OF DIGITAL CIRCUITS

[75] Inventors: Robert D. Lee, Denton; Robert W. Mounger, Dallas, both of Tex.

[73] Assignee: Dallas Semiconductor Corporation, Dallas, Tex.

[21] Appl. No.: 605,603

[22] Filed: Oct. 30, 1990

Related U.S. Application Data

[63] Continuation of Ser. No. 283,554, Dec. 9, 1988, Pat. No. 4,967,108.

[51] Int. Cl.$^5$ .................. H03K 19/00; H03K 5/00
[52] U.S. Cl. ........................ 307/520; 328/167; 364/724.01; 307/556; 307/543; 307/479
[58] Field of Search ............... 367/520, 555, 543, 556, 367/479; 328/165, 167; 364/724.01

[56] References Cited

U.S. PATENT DOCUMENTS

| | | | |
|---|---|---|---|
| 4,241,311 | 12/1980 | Massey | 328/167 |
| 4,442,500 | 4/1984 | Kongable et al. | 328/167 |
| 4,578,653 | 3/1986 | Howell | 307/520 |
| 4,786,823 | 11/1988 | Abe et al. | 307/520 |
| 4,791,379 | 12/1988 | Hughes et al. | 328/167 |
| 4,967,108 | 10/1990 | Lee et al. | 328/167 |

Primary Examiner—Stanley D. Miller
Assistant Examiner—Richard Roseen
Attorney, Agent, or Firm—Worsham, Forsythe, Samples & Wooldridge

[57] ABSTRACT

An integrated circuit filter wherein two digital inverters are used, with cutoff frequencies which bracket the desired passband frequency. (The cutoff frequency of the two digital inverters is selected by changing their RC time constants.) The inverter with the lower cutoff frequency has its output connected to the reset input of a counter, and the inverter with the higher cutoff-frequency has its output connected to the clock input of a counter.

8 Claims, 15 Drawing Sheets

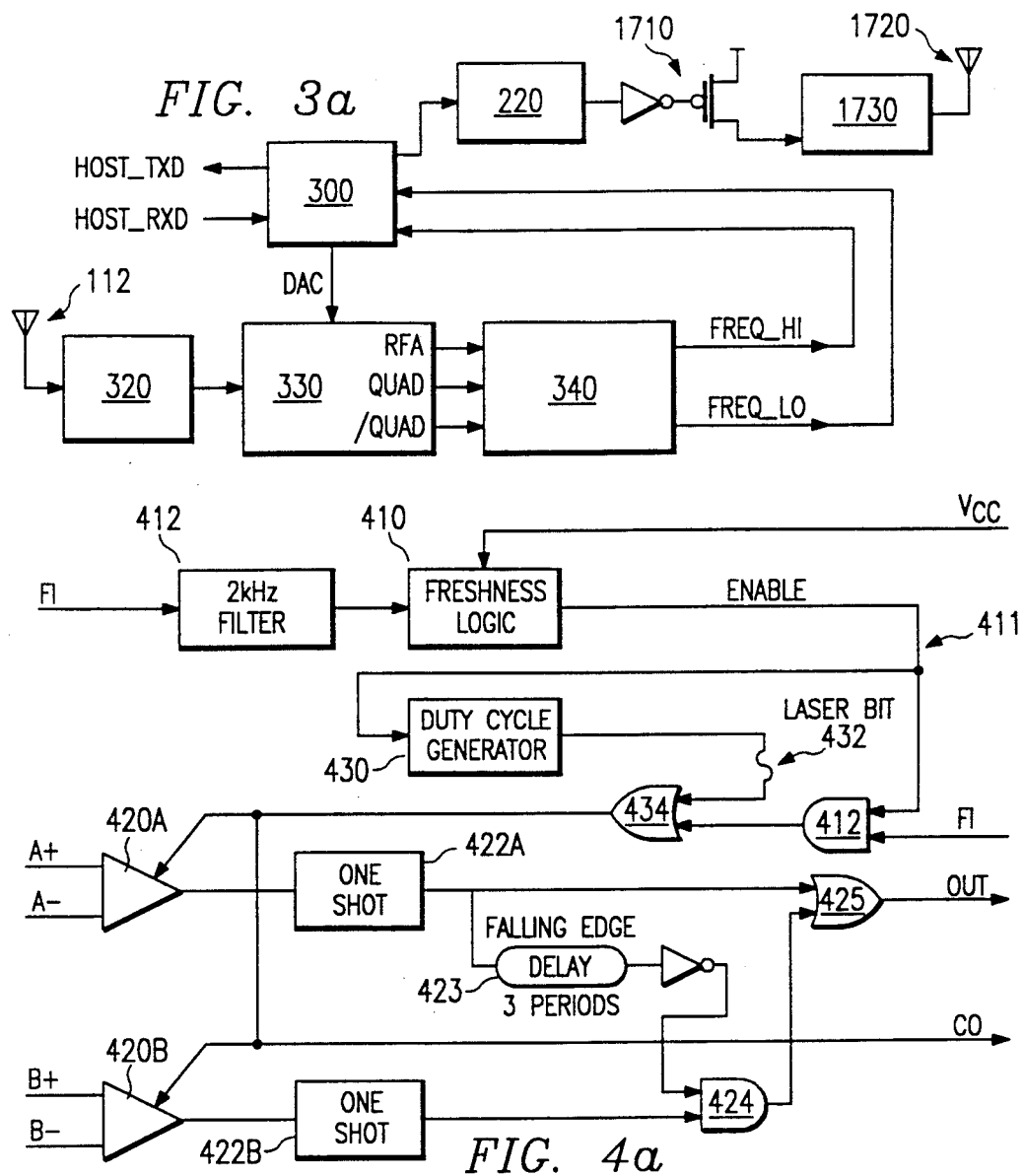

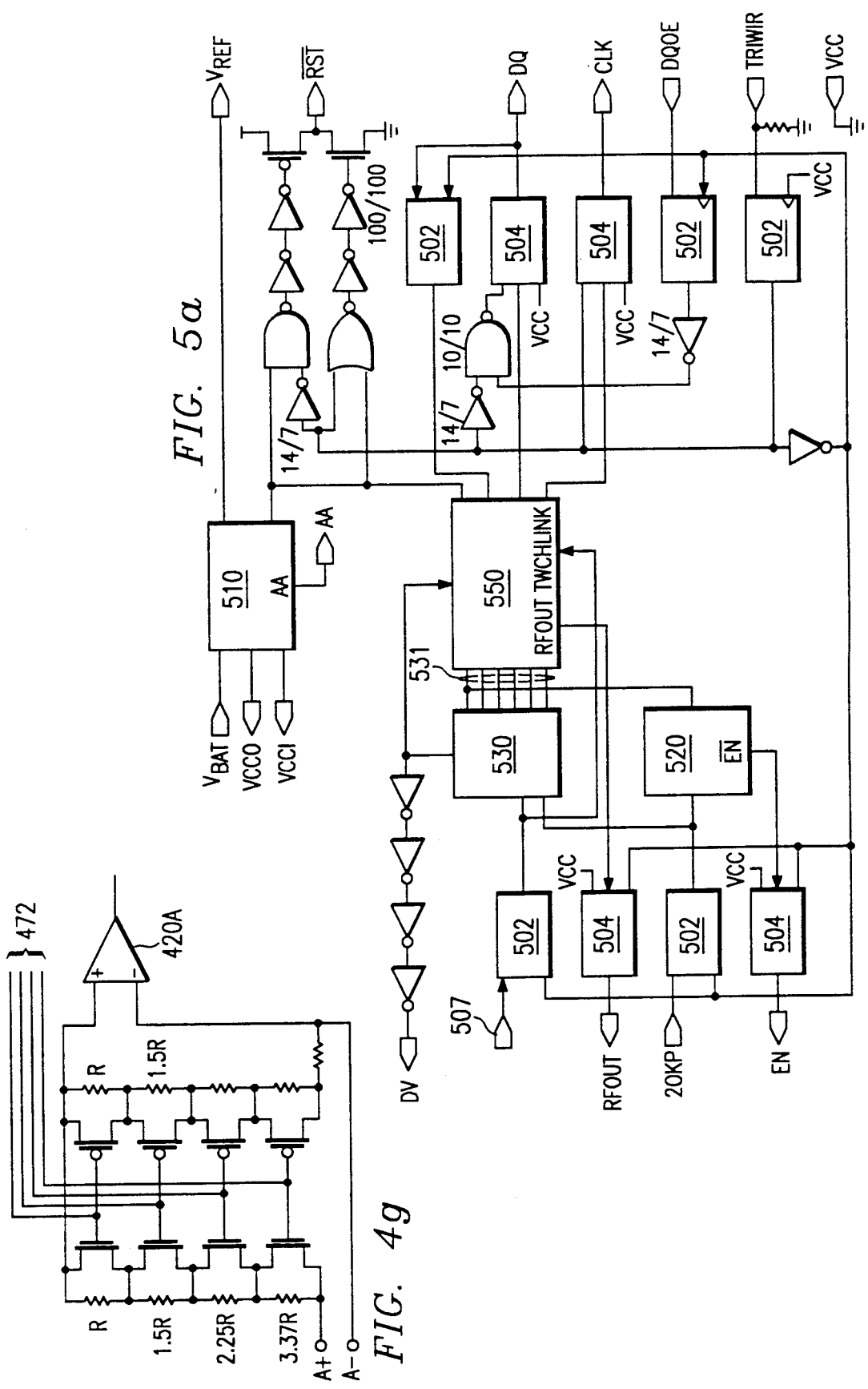

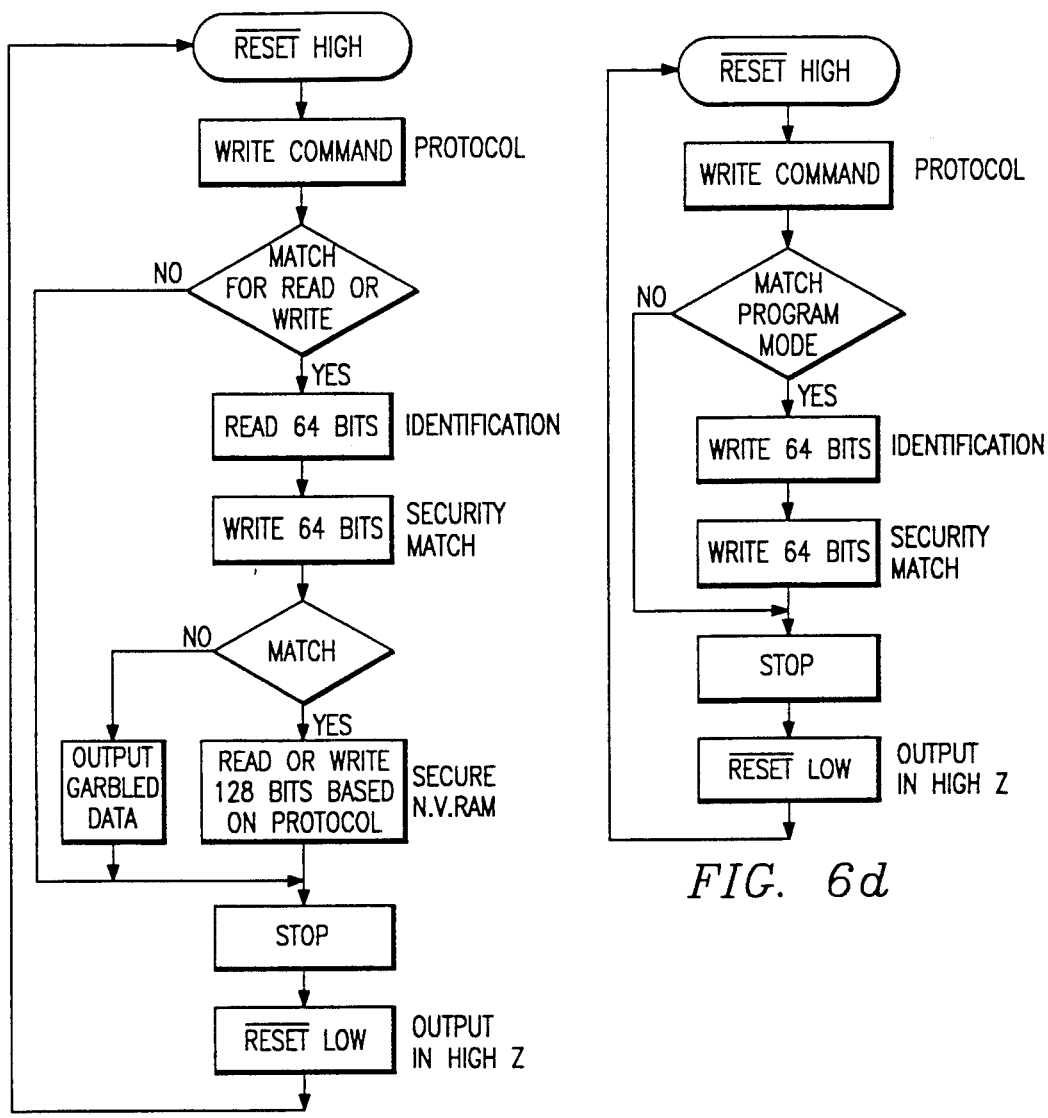
FIG. 6b
FIG. 6d
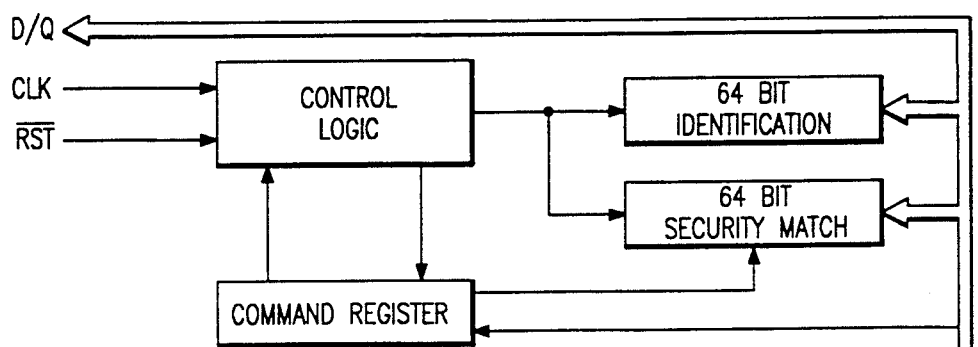
FIG. 6c

DIFFERENTIAL-TIME-CONSTANT BANDPASS FILTER USING THE ANALOG PROPERTIES OF DIGITAL CIRCUITS

This is a continuation of application Ser. No. 283,554, filed Dec. 9, 1988 now U.S. Pat. No. 4,967,108.

CROSS-REFERENCE TO OTHER APPLICATIONS

The following applications of common assignee, which are believed to have effective filing dates identical with that of the present application, are hereby incorporated by reference:

"MICROPOWERED RF-ACCESSIBLE MODULE WITH INTERNAL SERIAL BUS", Ser. No. 283,425, Filed 12/9/88;
"LOW-POWER RF RECEIVER", Ser. No. 282,819, Filed 12/9/88;
"WIRELESS DATA MODULE WITH TOUCH-CONTACT OVERRIDE", Ser. No. 283,534, Filed 12/9/88;
"MEMORY SYSTEM WITH MULTIPLE SERIAL PORTS", Ser. No. 282,402, Filed 12/9/88;
"CODED COMMUNICATION SYSTEM", Ser. No. 282,008, Filed 12/9/88;
"VERY-LOW-FREQUENCY WAKEUP OF MICROPOWERED RF RECEIVER", Ser. No. 283,427, Filed 12/9/88;
"WIRELESS COMMUNICATION SYSTEM WITH PARALLEL POLLING", Ser. No. 282,406, Filed 12/9/88;
"DECODER ARCHITECTURE FOR VARIABLE-SYMBOL-DURATION CODING", Ser. No. 283,140, Filed 12/9/88;
"RF-ACCESSIBLE DATA MODULE WITH HIGH-SPEED DOWNLOADING", Ser. No. 282,417, Filed 12/9/88;
"ANALOG CIRCUITS WITH BINARY WEIGHTED SELECTABLE COMPONENTS", Ser. No. 283,428, Filed 12/9/88;
"POWER SUPPLY INTERCEPT WITH REFERENCE OUTPUT", Ser. No. 283,426, Filed 12/9/88;
"WIRELESS DATA SYSTEM WITH ADDRESS ERROR LOCKOUT", Ser. No. 282,792, Filed 12/9/88;
"MULTIPORT MEMORY ACCESS SYSTEM WITH COMPRESSED WRITE", Ser. No. 283,549, Filed 12/9/88;
"INTEGRATED CIRCUIT WITH WIRELESS FRESHNESS SEAL", Ser. No. 282,410, Filed 12/9/88.

BACKGROUND AND SUMMARY OF THE INVENTION

The present invention relates to integrated circuits, and components thereof, which perform electrical filtering functions.

Filtering electrical signals is one of the most basic operations in electronics. Typically filtering functions will be defined with reference to the frequency domain. For example, if a complex signal is passed through a "low-pass" filter, only those signal components which are below a certain frequency will pass through the filter. Similarly, a "bandpass" filter will pass only those signal components which are within a range of frequencies around a center frequency. (The "bandwith" of a bandpass filter specifies how wide this range of frequencies is.) The filtering characteristics of an electrical circuit will be determined by the values and interconnections of the active and passive components used.

A filtering characteristic may be implemented in a wide variety of ways. The different possible implementations can differ in many respects. For example, where active devices are part of the filter, the power consumption of different implementations may vary. The sharpness of the boundaries between the passband and stopband may also vary. (For example, a very simple passive filter, which includes only one capacitor and one inductance in series, will typically have a slope of about 6 dB per octave at the passband edges. Thus, the wider the passband, the less sharp the passband edges will be. For many applications a sharper slope is needed. More complex circuits can provide much sharper slopes.) Different implementations may also differ in their area requirements, sensitivity to parameter variation, passband ripple, maximum attenuation, insertion loss, practicable frequency range, etc.

Digital signal processing ("DSP") can be used to readily implement a very wide variety of filter functions. However, unless the system design already includes a microprocessor or specialized DSP unit, and digital/analog and analog/digital converters, a substantial amount of hardware must be added before DSP techniques can be used. Moreover, DSP is likely to consume relatively large amounts of power, and may generate significant amounts of electrical noise.

The present invention provides a very simple filter circuit, which is all-digital but does not require the complex circuits and techniques used in DSP techniques. In effect, the present invention exploits the analog properties of digital circuit configurations.

It is will known that a simple digital inverter will usually have fairly sharp low-pass cutoff characteristics. That is, an analog input signal at a certain frequency, applied to a logic gate with a certain time constant, will provide a peak voltage which depends on only three factors: the peak voltage of the input signal; the RC time constant of the circuit; and the frequency of the input signal. If the frequency of the input signal is low enough, in relation to the RC time constant, the analog input signal will be able to switch the logic gate on each cycle, so that the output of the logic gate will contain a strong signal component at the input frequency.

The present invention makes use of this characteristic to provide a compact, low-power, bandpass filter. The characteristic of this filter has very sharp band edges, and essentially no ripple in the passband. Moreover, this filter configuration is relatively insensitive to parameter variation. This filter configuration is particularly advantageous at low frequencies and in low-power systems.

The presently preferred embodiment uses the time constants of the inputs to two logic gates to define the upper and lower passband edges. In the simplest example, where the passband center frequency is 2 kHz, two digital inverters are used, with cutoff frequencies which bracket the desired signal frequency (e.g. 1500 Hz and 2500 Hz). The cutoff frequency of the two digital inverters is selected by changing their RC time constants. (In practice, this is done merely by adding series resistance or shunt capacitance in the gate circuit.)

The inverter with the lower cutoff frequency has its output connected to the reset input of a counter, and the inverter with the higher cutoff frequency has its output connected to the clock input of a counter. The counter output is monitored, to see when a certain count threshold has occurred. The result is that, at very low frequencies, the counter will be reset approximately as often as it is clocked, so it will not accumulate. At very high frequencies, the counter will not be clocked. Thus, this very simple digital circuit provides a bandpass filter, with sharp passband edges. This filter also has the advantage of very sharp rejection of 1/f noise.

Note that this circuit performs both filtering and thresholding functions: an in-band signal must be present, and must have sufficient magnitude, before any AC component will appear in the output of the logic gate.

Note also that this circuit is not linear, and will treat complex signals quite differently from simple signals. This circuit is particularly well adapted to detecting the presence or absence of an in-band signal whose energy is largely concentrated at a single frequency. This circuit is less well adapted to passing more complex in-band signals, since (in this circuit) the different frequency components may interfere with each other.

In a further optional alternative, this circuit can be used to detect the presence of in-band energy, and enable a more complex circuit to perform more complex filtering operations accordingly. In a further optional alternative, the output of this circuit can be used to provide a clock signal which is used to synchronize other circuits to the principal in-band frequency of the incoming signal.

Another feature of this circuit is that even a strong in-band signal can be blocked by low-frequency noise. However, in applications where this is a problem, a large series capacitor can be used to attenuate the lowest frequencies.

The present invention is particularly advantageous in low-power applications. Where the incoming analog signal is expected to be a strong one, it can be connected directly (i.e. without amplification) to the logic gates being used for filtering. This means that no power is consumed if the incoming signal is not able to trip either of the logic gates.

PREFERRED SYSTEM CONTEXT OF THE PRESENT INVENTION

In the presently preferred embodiment, the claimed inventions are used in the context of a wireless-accessible data module. Various features of this system context will therefore be described in great detail below. The general features of this context will now be described.

Many of the innovative teachings of the present application will initially be described in the context of an embodiment, as shown in FIG. 1, wherein RF communication is established between a base station and one or more portable data modules. Each portable module can be accessed, in slave mode, by a base station 110 whenever the portable module comes within range of the base station.

A split frequency allocation is used on the RF channel. The base station transmits at a relatively low frequency (referred to herein as the "write-data" frequency), and the remote module transmits at a much higher frequency (referred to herein as the "read-data" frequency). The transmitter powers used permit communication over a very short range.

The portable data module is preferably extremely compact, and is powered by an small non-rechargeable battery. The base station is assumed not to be power-limited, but of course the innovative teachings set forth herein could also be applied to systems where some of the base stations are micropowered and/or some of the portable modules are not micropowered.

Within the remote module, each variable-length pulse in an incoming RF signal is converted into a variable-length burst of digital pulses. These bursts are decoded to derive commands and data. (The portable module operates in slave mode, so that the commands thus received govern its operation.) The portable module also contains an internal serial data bus, and memory or other devices in the portable module can be written to (or read from) over this serial bus, as commanded by the incoming RF signals.

The 3-wire serial data bus within the portable module can be used in a variety of ways. In the presently preferred embodiment, this bus is connected to an access control chip and to the converter chip. In an alternative embodiment, this bus is connected to a memory controller chip (instead of the access control chip), and, through the memory controller chip, to an SRAM. In further alternative embodiments, additional micropowered integrated circuits (such as a microprocessor or display driver) can also be connected to this bus if desired. Similarly, while the portable module preferably also contains access control logic, to provide security against unauthorized access, this can be omitted if desired.

To further conserve power, the portable module has the capability to be completely turned off or on, by wireless control. By keeping the receiver circuit turned off until the module is put into service, the battery life is conserved. In the off state (which is referred to as the "sleep" or "freshness seal" mode, as distinguished from the standby mode), the battery drain is reduced to transistor leakage currents—almost zero power (a few nanoamps). To put the module into service, the whole module is placed in a strong 2 kHz electromagnetic field. A strong coded signal at this frequency is detected by zero-standby-power circuits, with control logic to turn on or turn off all the other detection functions of the receiver.

BRIEF DESCRIPTION OF THE DRAWING

The present invention will be described with reference to the accompanying drawings, which show important sample embodiments of the invention and which are incorporated in the specification hereof by reference, wherein:

FIG. 3A is a block diagram, showing key signal connections, of the base station 110 shown in FIG. 1.

FIG. 4A shows the organization of some functions of the receiver chip 210 of the presently preferred embodiment.

4C shows a second embodiment 210' of the receiver chip, which can detect lower signal levels. FIG. 4G shows a further alternative embodiment, wherein digital automatic gain control is performed by using transistors to selectably switch out individual elements of a resistor ladder.

FIG. 5A shows the overall organization of the converter chip of the presently preferred embodiment.

FIG. 6B is a flow chart of the normal mode of operation of the access control chip of FIG. 22. FIG. 6C is a block diagram of the access control chip used in the presently preferred embodiment, in its program mode of operation. FIG. 6D is a flow chart of the program mode of operation of the access control chip of FIG. 6A.

DESCRIPTION OF THE PREFERRED EMBODIMENTS

Figure 1:
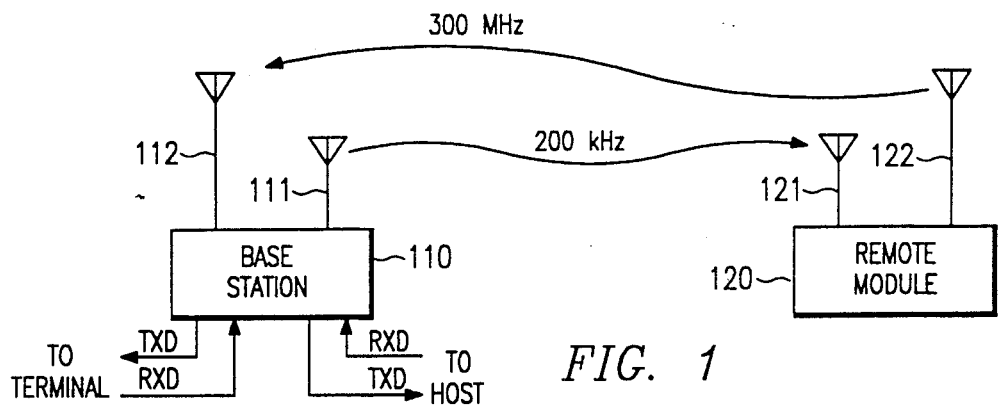
FIG. 1 shows the general organization of a wireless communication system enabled by the present invention, wherein a base station 110 can send data to a nearby remote module 120 at a first frequency, and can receive data from the remote module 120 at a second frequency.

The numerous innovative teachings of the present application will be described with particular reference to the presently preferred embodiment, wherein these innovative teachings are advantageously applied to the particular problems of a wireless electronic key system. However, it should be understood that this embodiment is only one example of the many advantageous uses of the innovative teachings herein. In general, statements made in the specification of the present application do not necessarily delimit any of the various claimed inventions. Moreover, some statements may apply to some inventive features but not to others.

APPLICATION ENVIRONMENT

Some of the many application environments for the preferred data communications system (with RF-accessible portable data modules) will now be described. Some of the innovative teachings set forth herein are particularly advantageous in some of these application environments. Among the innovative teachings set forth herein may be systems in which novel communications capabilities are applied to a particular application.

One particularly useful class of applications of the disclosed communication system is tracking work-in-process in automated manufacturing environments. A portable data module can, for example, be attached to a product on an assembly line. As the product moves from station to station, the portable module 120 can be interrogated to let the station known what the product is, what operations must be done, what the next destination is, etc., all without physical contact. One example of this is in semiconductor manufacturing, where an RF-accessible data module, embedded in a wafer carrier, can provide an instantly accessible detailed processing history of the wafer or lot being transported. This remotely accessible data memory provides an important tool for reconciling automated handling and transportation with highly flexible and reconfigurable workpiece routing.

Another advantages instance of work-in-process tracking is in livestock management. By attaching RF-accessible portable modules 120 to each animal, the history of each animal can be carried with it, and automated gates can be used to select animals as desired. For example, feeding can be controlled to optimize the rate of weight gain, and animals which are off their feed can be detected very promptly.

A related class of applications is for inventory control. Note that the disclosed communication system can be used for completely automatic inventory control, since each base station can readily ascertain what portable modules 120 are in its vicinity. Similarly, base stations mounted at every entrance and exit can track all movements of inventoried goods.

In addition, the wireless system disclosed can also be used to provide a wireless link between a hand-held terminal and a host system.

Another related class of applications is for monitoring and control of machinery or other capital equipment. For example, maintenance and use records of vehicles or other machinery can be automatically maintained and remotely queried.

Another class of applications is shipping containers of various kinds, including personal luggage. The read/write capability of the system provided by the innovative teachings herein means that destinations, tare weights, contents descriptions, etc. can be readily reprogrammed, and remotely detected. Thus, handling equipment can perform automated routing, specific shipments can readily be traced, and loss and theft can be greatly reduced.

Another important class of applications is in control of access to secure facilities. A portable module 120 can be used to store extensive identification parameters for the person to whom it is assigned, including (for example) height, weight, voice recognition parameters, or even parameters for image recognition (of fingerprints, faces, or retinas). This permits very sophisticated machine-recognition strategies to be implemented, without the data-flow bottlenecks which could occur (in a large facility) if such extensive recognition parameters were stored only in a central database. (Sampling and updating strategies would be used to assure integrity of the data in the remote modules 120 and in the central database.)

Area-specific access is also conveniently achievable. Base stations 110 can be positioned at key movement bottlenecks in a large building, so that the movements of individuals can be tracked. Thus, for example, in secure facilities, access intrusions can be detected, and movements of persons without clearance can be tracked. In hospitals, control of inpatient movements can be readily achieved. Where the present invention is used to monitor personnel movements, infrared sensors (or other such auxiliary remote sensors) can be used to detect any individual who is not carrying a functional remote module 120.

Medical applications generally are a very advantageous class of embodiments. Key parts of a patient's medical records (including, for example, recent weight and temperature data, and current medication authorizations) can be stored in a remote module 120 which is physically attached to the patient. Similarly, the source and history of specimens can be tracked by data modules.

Another class of applications is in financial instruments, such as credit cards, securities, large checks, letters of credit, or large-denomination currency. The disclosed communication system permits the convenience of bearer instruments to be provided without the untraceable diversion possibilities of conventional bearer instruments. In addition to the self-authenticating features of conventional cards or documents, the remote polling capability of the disclosed system permits convenient query for authentication, as well as remote detection of spurious items.

OVERALL SYSTEM ARCHITECTURE

The overall configuration of the system in which the presently preferred embodiment is preferably used will first be described in detail, since this system context highlights some of the advantages obtained by the present invention.

FIG. 1 schematically shows a very simple system embodiment, where RF communication is established between one base station module 110 and one portable data module. However, it should be noted that the disclosed architecture can accept many base stations and many portable data modules. The base station module 110 interfaces to a host system (e.g. using a wired serial bus), and also provides an RF communications link to one or more remote modules 120. The remote modules 120 are preferably small portable units, which operate with very high power efficiency from a battery. (Units of this type are generally referred to as "micropowered.")

A split frequency allocation is used on the RF channel. The base station 110 transmits at a relatively low frequency (referred to as the "write-data" frequency), and the remote module 120 transmits at a much higher frequency (referred to as the "read-data" frequency). In the presently preferred embodiment, the read-data frequency actually falls in the VHF or UHF bands, and the write-data frequency falls within the LF (low-frequency) band.

In the presently preferred embodiment, a pulse-width modulation coding scheme is used for transmissions on the write-data frequency channel. This scheme provides good noise immunity, and the code assignments are selected to optimize the data rate (by assigning the most frequently used symbols to the shortest pulse widths). The RF transmitter is simply switched on or off, to provide binary (on or off) pulses of varying length. A simple binary amplitude shift keying scheme is used for transmissions on the read-data channel.

The RF organization is designed for very short-range communications. However, the power levels of the RF channels are very unequal. Higher transmitter power and net receiver sensitivity are preferably located in the base station, where the power budget, and the volumetric constraints, are less limited.

Each active base station 110 can broadcast a query signal, to determine whether any portable data modules 120 are in its vicinity. If one of the remote modules 120 is within range (e.g. within 5 feet or less), it will detect the base station's query signal, and will then put out a beacon response by keying its transmitter (on the read-data frequency) with a square wave (e.g. by chopping at a 10 kHz rate). The base station scans the read-data frequency band, to detect any such beacons. Once the beacon is detected, the base station 110 can then initiate an RF communication session, and get read or write access to the data memory in the portable module 120.

One full transmission and reception cycle contains 280 bits, maximum, and is called a transaction. (The 10-year estimated battery life (for a 180 mA-hour lithium cell) allows for more than $10^8$ transactions during the portable module 120's lifetime.) In these transactions, the portable module 120 is slaved to the base station 110.

In any system which permits wireless data access, problems of data security and integrity must be considered. The disclosed preferred systems include two levels of functionality for this purpose. (Of course, as further alternatives, many known methods could be adapted to serve instead.) In the presently preferred embodiment, an access control chip is used in the portable module, and this chip includes a 64-bit identification field and a 64-bit password. In an alternative embodiment, the converter chip also includes a 16-bit chip-selection-tag field, which can be used for first-level scan of possible portable modules within range. In this alternative embodiment, the access control preferably also has the capability to generate random data when access is attempted without the correct password. (Preferably this capability is not used without the 16-bit chip-selection-tag field, since otherwise access collisions could occur whenever two modules were within range of a base station.)

In the principal preferred embodiment, after the foregoing interchange has initiated communication, the base transceiver transmits a command, on the write-data frequency, requesting (normally) that the module's 64-bit identification code be returned. After this operation finishes, a 64-bit password is transmitted to "unlock" the secure memory in the access control chip, so that data can be read from it or written to it.

Two features speed up the base station's ability to identify which of the possible remote modules may be within its range. These features may be particularly useful in applications where a large number of remote modules may come within range of a given base station.

First, in the alternative embodiment just mentioned, the base station can scan over segments of the 16-bit chip-selection-tag field to rapidly identify whether a given module is nearby. This means that all possible combinations of the 16-bit chip-select field can be scanned in $8 \times 2^2$ searches, rather than $2^{16}$ as would otherwise be required. (Of course, if more than one portable module is nearby simultaneously, the amount of time required to identify all modules present may well be longer than $8 \times 2^2$ searches.)

Secondly, a further optional alternative embodiment permits parallel polling of the 64-bit identification field. By commanding all modules within range to respond, the base station can see the 64-bit identification fields combined in what is almost a "wired-OR" fashion. That is, if any one of the portable modules within range is pulsing (reporting a "1" bit) in a given time window, the base will see a pulse; the base station will see the absence of a pulse only if all of the modules within range are reporting a "0" bit (not pulsing). This can be used, for example, to implement combinatorial logic functions on all (or some subfields of) the 64-bit identification field.

The portable data module is preferably extremely compact, and is micropowered. The base station is assumed not to be power-limited, but of course the innovative teachings set forth herein can also be applied to systems where some of the base stations are micropowered and/or some of the portable modules are not micropowered.

In this application, it should be noted that the term "RF" is used to refer to wireless electromagnetic radiation at all sub-optical frequencies, including frequencies which fall in the ultra-low frequency (ULF) band below 3000 Hz (cycles per second). (In some literature, such low frequencies may be referred to as audio frequencies, as distinguished from radio frequencies.)

PORTABLE WIRELESS DATA MODULE

The portable data module 120 provides a miniature transportable electronic memory, together with a self contained transmitter, receiver, and power supply, which provides wireless data communication, via a base station 110, with a host computer system. The small, lightweight construction makes the device suitable for carrying in a pocket or for direct attachment to any mobile object.

Figure 2A:
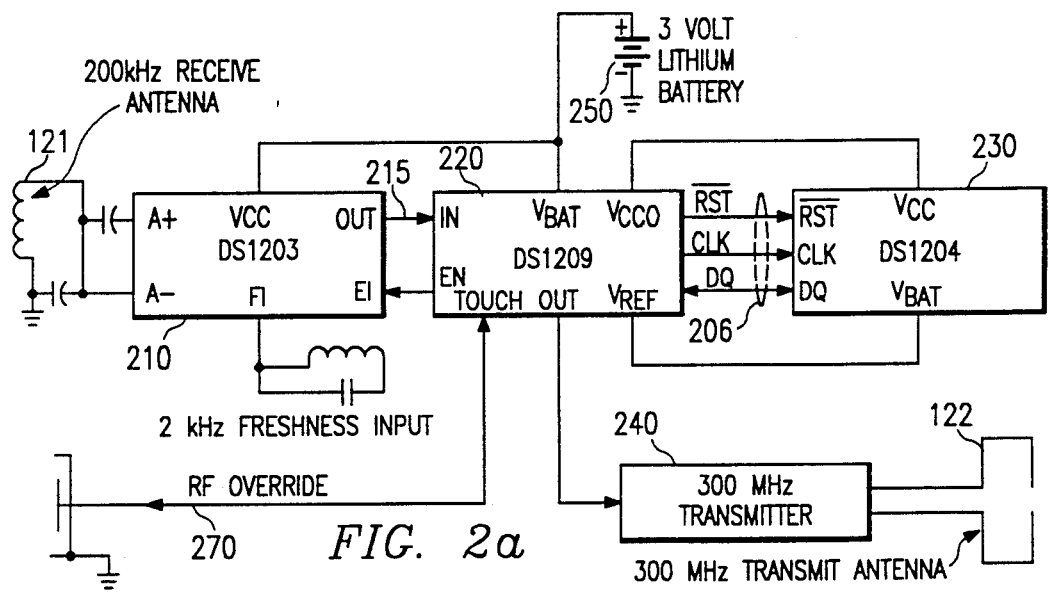
FIG. 2A shows a block diagram of the remote module 120, in a first embodiment.

FIG. 2A shows an overview of the remote module 120. The RF receiver functions are segregated on a receiver chip 210. No decoding is performed by the receiver chip 210. Decoding and encoding are performed by a converter chip 220, which also controls the serial data bus 206 within the remote module 120. The receiver chip 210 receives an RF signal (from an antenna tuned to the write-data frequency), and tracks the amplitude shifts of the RF signals to output a burst of pulses (at full digital logic levels). (The duration of the digital pulse bursts at the receiver chip's output corresponds to the duration of the analog pulse seen at its input from the write-data RF channel.) Since the output of the receiver chip 210 is simply pulse bursts, the receiver chip 210 is connected to the converter chip 220 by a simple one-wire bus, with no clock or reset signals required.

The data converter chip 220 decodes the pulse bursts provided by the receiver chip 210. This converter chip translates these digital pulse bursts from the one-wire pulse-width modulation protocol to data signals on a conventional 3-wire serial data bus 206 within the portable data module 120.

The 3-wire serial data bus 206 within the portable module can be used in a variety of ways. In the presently preferred embodiment, this bus is connected to an access control chip 230 and to the converter chip 220. (In an alternative embodiment, as seen in FIG. 2D, bus 206 is also connected to a memory controller chip 260, and, through the memory controller chip 260, to SRAMs 262.) In further alternative embodiments, additional micropowered integrated circuits (such as a microprocessor or display driver) can also be included in portable module 120, and connected to bus 206, if desired. Similarly, while the portable module preferably also contains access control logic, to provide security against unauthorized access (e.g. implemented as access control chip 230), this can be omitted if desired.

To further conserve power, the portable module 120 has the capability to be completely turned off or on, by wireless control. When the receiver circuits are turned off, the power consumption is essentially zero. By keeping the receiver circuits turned off until the module is put into service, the battery life is conserved. In the off state (which is referred to as the "sleep" or "freshness seal" mode, as distinguished from the standby mode), the battery drain is reduced to transistor leakage currents—almost zero power (a few nanoamps). To put the module into service, the whole module 120 is placed in a strong 2 kHz electromagnetic field. A strong coded signal at this frequency is detected by zero-standby-power circuits in the receiver chip 210, which control logic to turn on or turn off all the other detection functions of the receiver.

The variable-duration pulses received on the write-data channel, and converted by the receiver chip 210 into variable-length bursts of digital pulses on the one-wire connection to converter chip 220, are decoded by the converter chip 220 into one of the set of possible symbols (commands). In the presently preferred embodiment, the possible command set includes:

A. Write 0 or read when active;
B. Write 1 when active;
C. Activate Reset;
D. Beacon path;
E. Return to standby.

(Even if the portable module 120 does not receive a Return-to-standby command, it will automatically return to the idle mode to conserve power after a 2 ms quiet period.) However, it should be understood that a variety of other command sets could be used instead.

These commands are interpreted by the converter chip 220 to control the three-wire serial bus 206. This bus, as is conventional, includes one line reserved for clock signals, one bidirectional data line, and one line reserved for Reset signals. Such a bus can readily be connected to serial-port memory chips, or to port pins on a DS5000 or on other microcontrollers sold by Dallas Semiconductor.

One important alternative embodiment (shown in FIG. 4C, and discussed in detail below) uses a modified receiver chip 210', and a slightly different RF frequency allocation. In this embodiment, the portable data module 120 has the capability to detect quite weak RF signals (RF voltages down to about 300 microVolt). To implement this detection ability, the alternative receiver chip 210' uses op amps rather than comparators at its input. To minimize the power drain of these op amps in standby mode, a much lower frequency (e.g. ten times lower than the write-data frequency) is used solely for wakeup. Lower-power op amps, which have a lower slew rate and smaller gain-bandwidth product than would be necessary to track the signals in the write-data channel, monitor this wakeup frequency. If a wakeup signal is detected, the beacon is turned on, and the detection circuits in the write-data channel are turned on.

A touch-contact port 270 is also provided. Signals received at this port will override signals received from the antenna 121 which receives signals on the write-data frequency. Preferably this input is connected directly to the converter chip 220, so that antenna 121 and receiver chip 210 are bypassed if this input is used. In the presently preferred embodiment, the touch contact port 270 transfers data using a carrier frequency of 100 kHz.

The port 270 provides a backup interface mode, which can be used to supplement the RF interface in (e.g.) high noise environments, or when the battery of the portable module 120 is weak. The capability to handle a 100 kHz interface also provides useful versatility, since the module can be reconfigured fairly easily to (for example) provide capability for both 100 kHz and 200 kHz RF links.

An advantage of the encoding used on the write-data channel is that it is relatively insensitive to frequency. For example, when data is being transferred over the touch-contact port 270, the exact same coding can be used as would be used for transfer over the write-data channel. The data rate will be lower, because the frequency is lower, but the state-machine decoder circuits in the converter chip 220 can still operate in the same way. Similarly, the frequency assigned to the write-data channel can easily by changed, simply by changing or varying the reactive elements in the turned circuits, but the coding scheme will still provide a good balance of data rate with noise immunity at whatever frequency is being used.

The variable-duration pulses sent by the base station 110 at the write-data frequency (200 kHz) are picked up by the write-data receive antenna 121, and are thereby seen at the comparator input terminals (A+ and A−) of the receiver chip 210. Unless the receiver chip 210 is in freshness seal mode (as described below), the receiver chip 210 will amplify the analog input pulse signals from as low as 10 mV to provide full digital level pulse-burst signals at the output pin. The receiver chip 210 does not demodulate the RF input signal, but simply amplifies its instantaneous level. Thus, the carrier is a component of the amplified digital signal, so that what is sent to the converter chip 220 is not merely a series of variable-length pulses, but a series of variable-length bursts of constant-length pulses.

In the presently preferred embodiment, two parallel tuned antenna circuits 121 are used for reception the write-data (200 kHz or equivalent) frequency, and each of the antenna circuits is separately connected to an open loop comparator. (These connections are shown in FIG. 4A as input pairs A+/A− and B+/B−.)

In alternative embodiments, the tuned antenna circuit 121 at the write-data frequency is also coupled to a tuned tank circuit, and/or to a notch filter centered at half the pass frequency, to provide sharper passband characteristics.

A tuned circuit with a discrete inductance is used to receive signals at the freshness seal frequency, but no other antenna is used. (Thus, the effective antenna cross-section at this frequency is very small. This is acceptable because the freshness seal only needs to detect very strong signals.) The input to the freshness-seal-signal detection circuits is labelled as signal "FI".

The converter chip 220 is basically a state machine, which controls the serial bus 206 and determines what action is to be taken by the attached access control chip 230. The access control chip 230 receives signals from the converter chip 220 over the bus 206. These signals either write data into or read data out of the access control chip 230. The access control chip 230 includes specially partitioned memory space, which stores a 64 bit identification code and a 64-bit password. The password memory is combined with comparison logic, so that data accesses are screened for password match. Preferably the password memory (which, in this embodiment, includes 128 bits of read/write nonvolatile memory) cannot be read, and can be overwritten only by an access which includes a match with the existing password.

When the portable data module is receiving data to store in the access control chip 230, the converter chip 220 generates the CLK, RST* and data signals, in accordance with data received from the receiver chip 210. However, when the portable data module is being read, data is transmitted back to the base station 110 via a 300 MHz transmitter which is controlled by the converter chip 220.

The portable data module is self powered by a lithium energy cell. The unit is designed to last for over ten years. The converter chip 220 and receiver chip 210 control the energy consumption and power distribution within the module.

Figure 2C:
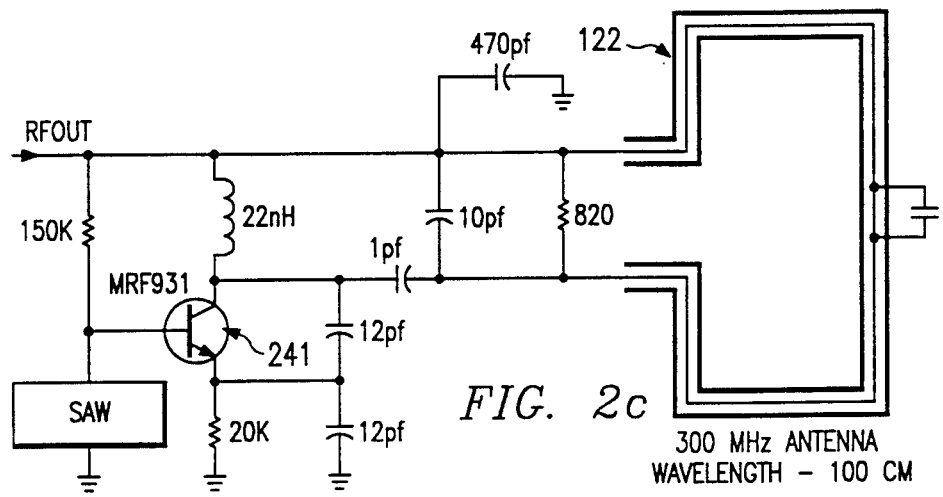
FIGS. 2B and 2C show a more detailed circuit diagram of the module of FIG. 2A, including discrete reactances and the VHF/UHF transmitter circuit.
Figure 2B:
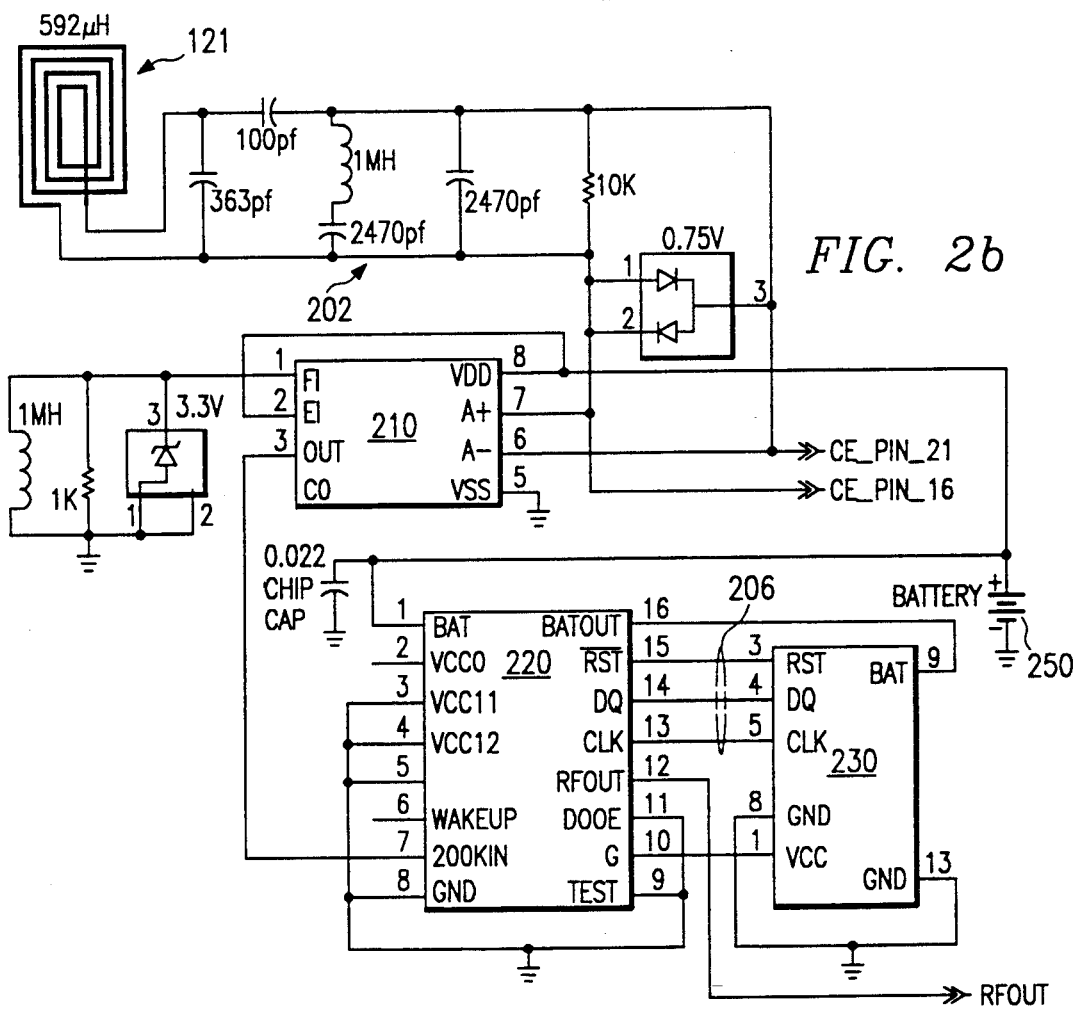
Figure 2D:
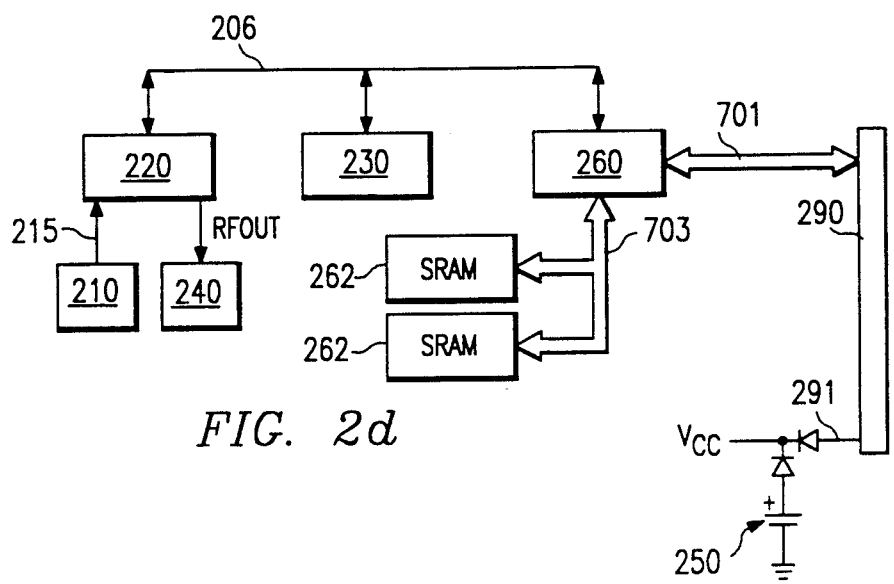
FIG. 2D shows an alternative embodiment of the portable module portion of FIG. 2A, including a large block of memory, a memory access controller, and an external connector which allows a rapid readout of the stored data.

FIGS. 2A–2C show a more detailed view of the portable module 120 of the presently preferred embodiment. As shown in FIG. 2B, a tuned coil 121 acts as an antenna, and is connected, through an RLC filter network, to a receiver chip 210. The receiver chip 210 provides an output, at full digital levels, to a data converter chip 220. The receiver chip 210 and the data converter chip 220 are both powered from a battery 250, which in the presently preferred embodiment is a lithium battery.

In addition, an access control chip 230 is connected to the data converter chip 220 by the 3-wire serial data bus 206. The access control chip 230 can receives its power supply voltage from the data converter chip 220 either over the RST* line, or (when RST* is low), over the $V_{BAT}$ input (which is connected to the reduced-voltage supply BATOUT of the converter chip 220).

The data converter chip 220 also provides a signal RFOUT, which controls a transmitter 240 (shown in FIG. 2C).

ALTERNATIVE EMBODIMENT WITH FAST DATA DUMP

FIG. 2D shows an alternative embodiment of the portable module 120 portions shown in FIG. 2B. In this alternative embodiment, a memory access controller 260 is also connected to the 3-wire data bus 206 from the converter chip 220 to the access control chip 230. This memory controller, in turn, is connected to a block of memory, such as a pair of 256K SRAMs 262. (In optional alternative embodiments, the preferred memory access controller 260 can control up to 16 32K×8 SRAMs.)

FIG. 2D also shows the further alternative feature of a parallel port contact 290. (Note that this is not the same as the touch-contact port 270, which provides serial data transfer. The parallel port 290, unlike the serial port 270, provides data transfer which is much faster than that achievable over the RF channel.) The parallel port 290 can be connected to a complementary parallel port connector, to permit a rapid dump of all the data in memory with burden on the battery 250. However, it should be noted that a parallel port contact 290 can be used without the memory controller chip 260 (especially if serial-ported memories 262 are used, or if a microprocessor is also included in the portable module). Conversely, a memory controller chip 260 can be used advantageously, even if the parallel port contact 290 is not included.

The memory controller chip 260, in the presently preferred embodiment, provides dual-ported access to a parallel memory bus 703. Access is shared between serial bus 206 and parallel bus 701 (which is connected to the connector 290 in embodiments like that of FIG. 2D).

Note that parallel port 290 preferably also includes a power input, which is connected to a power supply input of the converter chip 220. When the converter chip 220 detects a voltage higher than $V_{BAT}$ on this input, it will switch over to the higher supply voltage. This means that the rapid readout cycles will not place a burden on the battery 250.

This embodiment permits, a large volume of data, collected in portable modules over a relatively long period of time, to be rapidly downloaded. Thus, the wireless communications channels can be organized for very high power efficiency, at very low data rates, since a high-data-rate read operation can always be accomplished by other means. A further advantage of this class of embodiments is that very large amounts of memory (e.g. a megabyte) can be used in a micropowered portable module, while still achieving long data-retention lifetimes. This fast data dump capability is particularly advantageous for applications (such as delivery logbooks, retail inventory, or vehicle management), where data is collected slowly in the field, and then rapidly dumped at a more central location.

ALTERNATIVE EMBODIMENT WITH LOW-FREQUENCY WAKEUP

One important alternative embodiment uses a modified receiver chip 210', and a slightly different RF frequency allocation. In this embodiment, the portable data module 120 has the capability to detect quite weak RF signals (RF voltages down to about 300 microVolt).

To implement this detection ability, the alternative receiver chip 210' (shown in FIG. 4C) uses op amps rather than comparators at its input. To minimize the power drain of these op amps in standby mode, an additional RF frequency (which is a much lower frequency, e.g. ten times lower, than the write-data frequency) is used solely for wakeup. When a base station 110 is broadcasting to find portable modules 120, it broadcasts on this wakeup frequency. In the receiver chip 210', the write-data frequency is not monitored when the module 120 is in standby mode. Instead, another pair of op amps, which have a lower slew rate and smaller gain-bandwidth product than those used to track the signals on the write-data channel, are kept active to monitor an antenna input at the wakeup frequency. Any inputs received on the wakeup frequency are decoded by a very simple thresholding scheme, like that used to decode symbols on the write-data frequency, which provides noise rejection. If a properly encoded signal is detected on the wakeup frequency, the (higher-powered) detection circuits in the write-data channel are turned on.

In the standby mode, the receiver chip 210 will draw about 1 microAmp, while amplifying incoming RF signals at the wakeup frequency (20 kHz in this example) to digital pulse bursts on one-wire bus 215. These pulse bursts are monitored by the converter chip 220, and when the proper sequence occurs the converter chip 220 provides an enable signal EN back to input EI of the receiver chip 210. After this enable signal has been received, the receiver chip 210 activate a higher-power pair of op amps, which have a high enough slew rate and gain-bandwidth product to track signals at the write-data frequency, and which draw about 100 microAmp. The receiver chip 210 will stay enabled for as long as signals are seen at either the write-data frequency or the wakeup frequency. If neither signal is present for 2 msec, the 200 kHz receiver will automatically turn off. The 200 kHz receiver can also be turned off by a specific sequence of 20 kHz signals.

TRANSMITTER

FIG. 2C shows details of the transmitter 240. This transmitter is powered and controlled by signal RFOUT, which is provided by the data converter chip 220. When the signal RFOUT is pulled high, transistor 241 is enabled to turn on. The transistor 241, in this example, is an NPN transistor with a cutoff frequency substantially higher than the desired transmission frequency. For example, an MRF931 has been found to be satisfactory.

The various reactances shown provide feedback, so that the transistor 241 sustains oscillation. The oscillation output is connected to read-data transmit antenna 122. Antenna 122 is preferably an etched PC board trace, tuned by a discrete capacitor 242 to achieve resonance at the desired operating wavelength (which in this example about 100 centimeters). (However, it must be understood that the circuit configuration of these reactances could be rearranged in a tremendous variety of ways. Moreover, different values can be readily substituted for the specific sample values given.

It is further contemplated that frequency stabilization, using low-loss surface-acoustic-wave (SAW) devices, will become advantageous. SAW devices with reasonably low insertion losses (close to 1 dB) are now available reasonably cheaply. Such stabilization means that the base station does not have to sweep so broad a band to detect an incoming signal.

Note that FIG. 2C shows a SAW filter used to provide a reactance from gate to ground, but a capacitor may be used instead if a lower insertion loss or lower Q is desired. Note also that the antenna is connected across the tank circuit: this has been found to be advantageous in such low-power applications.

BASE STATION 110

FIG. 3A shows key blocks and key signal connection of the base station 110 of the presently preferred embodiment. A digital interface 300 interfaces to a standard RS232 bus, using data lines HOST$_{13}$ TXD and HOST_RXD. This digital interface permits the host computer (or a terminal) to provide an interface to the transmitter 301 and the receiver 302.

The receiver 301 is shown in several blocks, to clarify the functions performed. Antenna 112 is tuned to the read-data frequency, to receive RF signals transmitted by a portable data module 120. This antenna is connected, through a bandpass filter 320, to an RF receiver section 330. Section 330 provides outputs RFA, indicating amplitude of the RF signal, and outputs QUAD and /QUAD, which respectively correspond to the average amplitude of leading and lagging phase components.

Block 340 performs the ASK (amplitude-shift keying) and automatic frequency control (AFC) functions. The AFC operation is controlled by a feedback loop which extends through several of the components: The ASK-/AFC block 340 compares the signals QUAD and /QUAD, to determine if the frequency needs to be adjusted. That is, phase error in one direction will indicate that the local oscillator is leading the incoming RF signal, and phase error in an opposite direction will mean that the local oscillator is lagging. When such a lead or lag or condition is detected, the FREQ_HIGH or FREQ_LOW lines are driven. In response to one of these signals occurring, the digital interface 300 increments or decrements a control value, which is converted by a digital/analog converter in the interface 300 to provide the signal DAC. The signal DAC is fed back to control the local oscillator frequency and RF section 330. Thus, these connections in effect configure a phase-locked loop.

In addition, the digital interface 300 controls a 200 kHz transmitter 302. This transmitter is shown as switching (control) transistor 1710, antenna 1720 (or 111), and resonator circuit 1730.

OPERATION

To clarify the described relations and protocols, the steps in a sample transaction will now be described in detail. This sample transaction will be a normal read of the data in access control chip 230. Assume that the access control chip 230 has contents as follows (where each byte is represented as two hexadecimal numbers):
ID: 31 31 31 31 31 31 31 31 (hexadecimal)
Password: 01 23 45 67 89 AB CD EF (hexadecimal)
Data: 33 33 33 33 33 33 33 33 33 33 33 33 33 33 33 33 (hexadecimal)

To access this remote module 120, the base station will have to know (from user input, or from data stored in the host computer) that the password is 01 23 45 67 89 AB CD EF. Next, the base station 110 is told (for example) to read the first portable data module it finds.

The conversation now proceeds as follows:

Step 1: The base station turns on the beacons of all keys in range. This is done by sending (on the write-data frequency) pulse group E (50 pulses)(to assure that all converter chips 220 are sent to the inactive 000 state), followed by pulse groups D(40), A(10), and B(20). Thus, the complete transmission at 200 kHz would be:
50 pulses, q, 40 pulses, q, 10 pulses, q, 20 pulses, q.
(The symbol "q" is used to indicate a quiet space of at least 50 microseconds.) After this transmission, any portable modules in range will be in beacon mode, and will be transmitting a 300 MHz (±15 MHz) RF carrier, chopped at a 5 kHz rate.

Step 2: The base station 110 then sweeps its 100 kHz bandwidth input band pass filter 320 from 285 MHz to 315 MHz. At each step the base station 110 looks for the presence of any beacon from a portable module 120. Since any beacon will be chopped at 5 kHz (100 microsec on, 100 microsec off) the base station 110 must search each frequency range for at least 100 microseconds. (In alternative embodiments the sweep time can be decreased by increasing the beacon chopping frequency.) If no signal is present at a given step, the bandpass filter 320 is stepped to the next frequency range. If signal is present, the base station 110 records the times $t_1, t_2, \ldots t_{10}$ of the next ten rising edges of 300 MHz signal. If the delays $t_2-t_1, t_3-t_2, \ldots t_{10}-t_9$ are all within 20% of each other, and both are in the range 167–250 microsec (4–6 kHz), then a portable module 120 is assumed to be present, and the base station 110 goes to step 4. If not, the band pass filter is stepped to the next frequency step.

Step 3: The base station 110 now sends out a command to initialize the portable data module 120, by sending pulse group C (30 pulses) at 200 kHz. On the first rising edge of the pulse packet, the converter chip 220 turns off the 300 MHz transmitter 240, and takes the portable module 120 out of beacon mode.

Step 4: The base station now sends a 24 bit command word to the portable module 120. This command word will be passed over the serial bus 206 to access control chip 230. For example, to initiate a normal read, the 24 bit word in hex is A00162. Since this is sent LSB first, the base station 110 transmission is as follows (where a write 0 command is represented by 10 pulses, and a write 1 is represented by 20 pulses):

| | |
|---|---|
| 10 pulses, q, 20 pulses, q, 10 pulses, q, 10 pulses, q, | 2 |
| 10 pulses, q, 20 pulses, q, 20 pulses, q, 10 pulses, q, | 6 |
| 20 pulses, q, 10 pulses, q, 10 pulses, q, 10 pulses, q, | 1 |
| 10 pulses, q, 10 pulses, q, 10 pulses, q, 10 pulses, q, | 0 |
| 10 pulses, q, 10 pulses, q, 10 pulses, q, 10 pulses, q, | 0 |
| 10 pulses, q, 20 pulses, q, 10 pulses, q, 20 pulses, q, | A |

Step 5: The access control chip 230 will now read out data for the next 64 clock cycles. The data read out will be that in its ID field. To read each bit, the base station 110 sends out 10 pulses, and then checks, 100 microsec later, for the presence of a 300 MHz signal. If the base station detects a 300 MHz signal at this instant, it infers that a "1" has been read out; otherwise the base station infers that a "0" has been read. This step is repeated for each of the 64 bits. Note that this readout scheme has the advantage that the timing of communication is entirely controlled by the base station. This provides additional noise margin. This also permits reliable communication even if significant clock inaccuracy exists in the micropowered portable module.

Step 6: Next (unless the base station rejects the identification data just received), the 64-bit password is sent to the portable module 120 as a series of write commands. Accordingly, the password data will be written to the access control chip 230.

Step 7: The access control chip 230 will now read out 128 bits of data from its data field. After receiving this data, the base station 110 can respond appropriately. For example, the base station may report the 64 bits of identification and 128 bits of data back to its host computer. The host computer may then command the base station to initiate another transaction (such as a data write), or to reprogram the identification or password fields of the module, or to resume polling for other remote modules, or to initiate a physical action (such as unlocking a door).

Several of the alternative embodiments mentioned would also require additional steps in this transaction. For example, optionally the base station 110 may first send a "wake-up" or enable command, with a 16-bit chip-selection-tag and one additional byte of command parameters. (In a further alternative, this may be a masked wakeup, so that the byte of command parameters will specify which fields are to be compared to the transmitted value.) However, this step is not used in the presently preferred embodiment, since the 16-bit chip-selection-tag field is not used. This wake-up or enable step may be repeated after scanning, if duty cycling is used to avoid the chance of missing a portable module which simply happened to be in the quiescent part of its duty cycle.

RECEIVER CHIP 210

This integrated circuit in the portable data module performs the RF reception functions.

The receiver chip 210, as configured in the presently preferred embodiment, is an ultra-low-power dual comparator circuit designed to listen for signals of up to 250 kHz. Input signals as small as 10 mV peak-to-peak will be amplified to provide full digital signals, at power supply levels, at the output.

A dual comparator arrangement is used, where an alternate antenna input is used if no signal is found on the primary antenna input. By using two orthogonal antennas, the risk of nulls or dead spots are eliminated.

Note that the receiver chip 210 of the preferred embodiment can also be used advantageously in many systems other than the preferred system embodiment. For example, this integrated circuit can also be used as a front end for wireless communication links using infrared, ultrasonic, or magnetic field. The ultra-low-power features of this integrated circuit are particularly advantageous in applications where a portable module must be permanently powered by an energy source capable of lasting over ten years. The "freshness seal" logic, which provides a zero-power sleep mode, is particularly advantageous in this respect. The available duty cycle options can further reduce power consumption in special applications.

Two alternative embodiments of this chip are specifically disclosed. The first embodiment uses op amps for detection, and can detect RF voltages as low as about 0.1 mV. The second (and preferred) embodiment uses comparators rather than op amps, but requires a significantly higher RF signal for detection.

FIG. 4A shows a block diagram of the micropowered receiver chip 210. Two comparators 420 are used to amplify analog inputs. Comparator 420A receives inputs A+/A−, and comparator 420B receives inputs B+/B−. Each comparator is followed by a one-shot 422, to ensure that the digital outputs have a certain minimum duration, and to guarantee that the output state will be zero if no input is present.

When the comparators 420 are enabled, an AC input signal which exceeds 10 mV peak-to-peak will cause the comparator to change state at least twice per full cycle of the AC input signal. When the comparator output goes high, it will fire one-shot 422. This produces an output signal at full digital levels, with a certain minimum width per output pulse.

Several inputs are relevant to enablement of these comparators:

1) The comparators will not operate in any case, unless the freshness-seal logic 410 has previously been triggered (by an appropriate signal on line FI) to hold the enable line 411 high, and thereby bring the receiver chip 210 out of sleep mode.

2) A duty cycle generator 430 generates periodic duty cycle waveform, for an on/off ratio which can be programmed to be anywhere from 64/64 down to 1/64. (Whatever the ratio, the duration of the on-state is preferably at least 2 msec.) The duty cycle generator is enabled or disabled by a laser fuse 432. (For clarity, the Figure shows this fuse as a simple series connection. However, in practice, this fuse is actually used to control a gate which provides the desired logic state.)

3) An enable input (EI) can be driven by the data converter chip 220, to turn on the comparators 420 directly (if the freshness seal has been enabled). This input is particularly useful when the duty cycle feature is being used, since it permits the converter chip to override the duty cycle as soon as a data transaction begins.

4) While comparator 420A is active, it will provide digital outputs through OR gate 425, and AND gate 424 will cut off the output of comparator 420B. However, when no signal is detected at terminals A+/A− for at least three pulse periods, delay/integrator 423 will change state, enabling AND gate 424 to pass through the output from comparator 420B (and one-shot 422B).

The freshness input (FI) is used to seal or break receiver chip 210 power consumption activity. This input accepts 2 kHz pulse packets at a signal level greater than one Volt. When the seal is broken, comparators "A" and "B" continuously listen for activity at the inputs. When the seal is intact, no listening occurs and the receiver chip 210 enters a zero-power-consumption sleep mode.

Figure 4B:
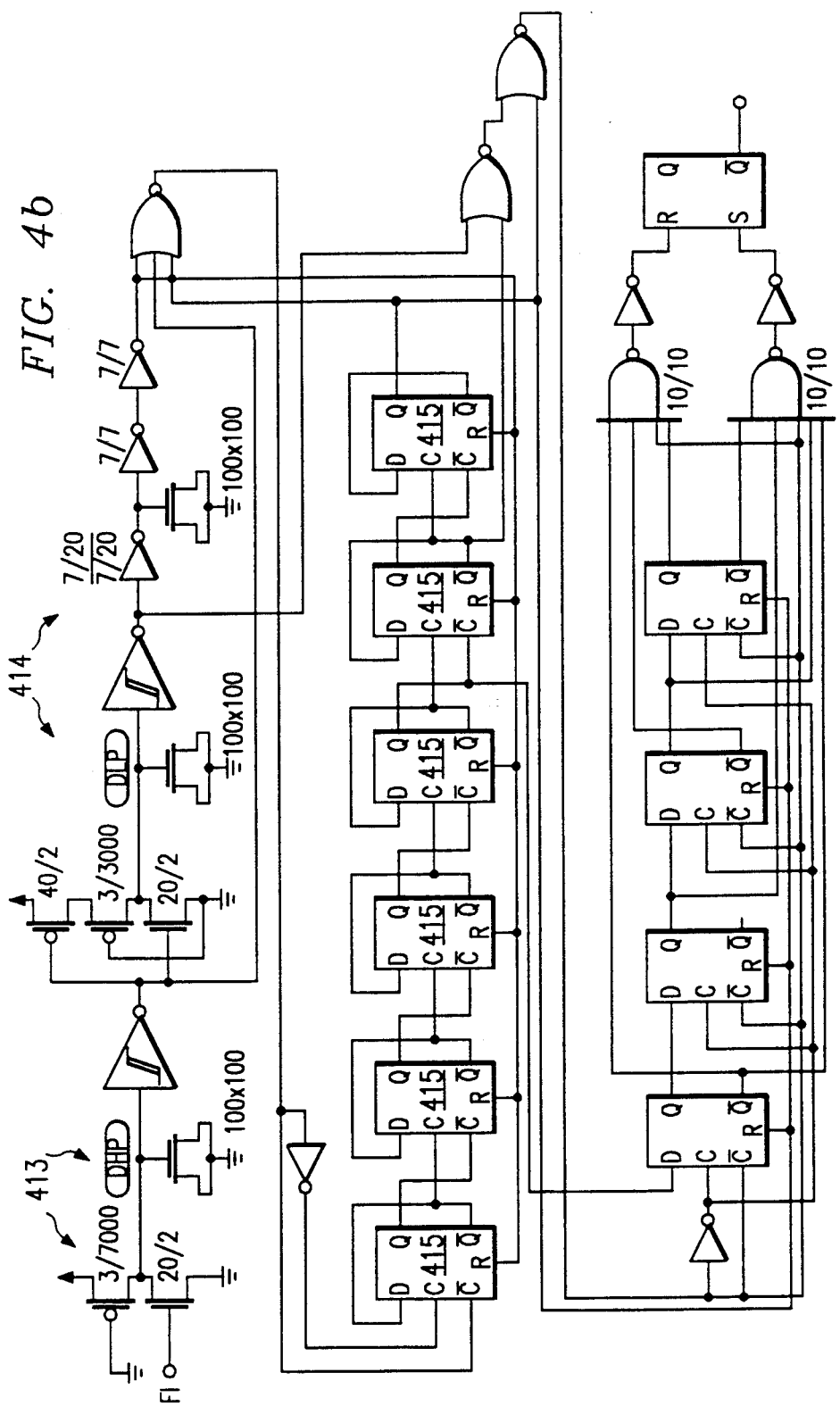
FIG. 4B shows the preferred implementation of the bandpass filter used in the receiver chip 210. FIG.

FIG. 4B shows details of the bandpass filter preferably used in the freshness seal logic 410. The input FI is connected to a first timing circuit 413, in which the time constant is determined by the RC time constant of a PMOS load element and a depletion capacitor. The output of this stage is connected both to a counting chain 415 and to a second timing circuit 414. The second timing circuit will add an additional time delay onto the delay of the first circuit, so that the output of the second circuit will have a lower cutoff frequency than will the output of the first timing circuit. If the second timing circuit is permitted to switch its output, it will reset the elements of the counting chain 415, and also block the outputs of the first timing circuit from clocking the counting chain 415. Counting chain 415 is combined with additional flip-flops 416 as shown, to perform the freshness-seal filtering and decoding function as described.

As shown in FIG. 4A, the (optional) duty cycle generator 430 in the receiver chip 210 provides additional power savings.

ALTERNATIVE HIGHER-SENSITIVITY RECEIVER CHIP 210'

FIG. 4C shows the analog portions of an alternative embodiment 210' of the receiver chip 210. This alternative embodiment does not have as low power consumption as the primary embodiment 210, but does have much higher sensitivity.

Two chains of op amps are used. The first chain uses op amps 442 which have a relatively low slew rate, and require a relatively modest bias current. This chain monitors the 20 kHz wakeup frequency to detect wakeup signals. The second chain uses op amps 444 which have significantly higher slew rates, and correspondingly higher bias current requirements. The slew rates and reactance values of this chain are chosen to permit detection of signals at the write-data frequency, which, in the presently preferred embodiment, is 200 kHz. The first op amp chain, when active, uses 1 to 2 microamps of bias current, and the second op amp chain, when active, uses about 200 microAmps. Thus, it may be seen that a substantial power savings is achieved by shutting down the op amps 444 in the standby mode.

In FIG. 4C, it should be noted that the series and feedback resistors are shown as variable resistors 448. These resistors, although not adjustable by the end user, do illustrate a further innovative teaching.

Figure 4D:
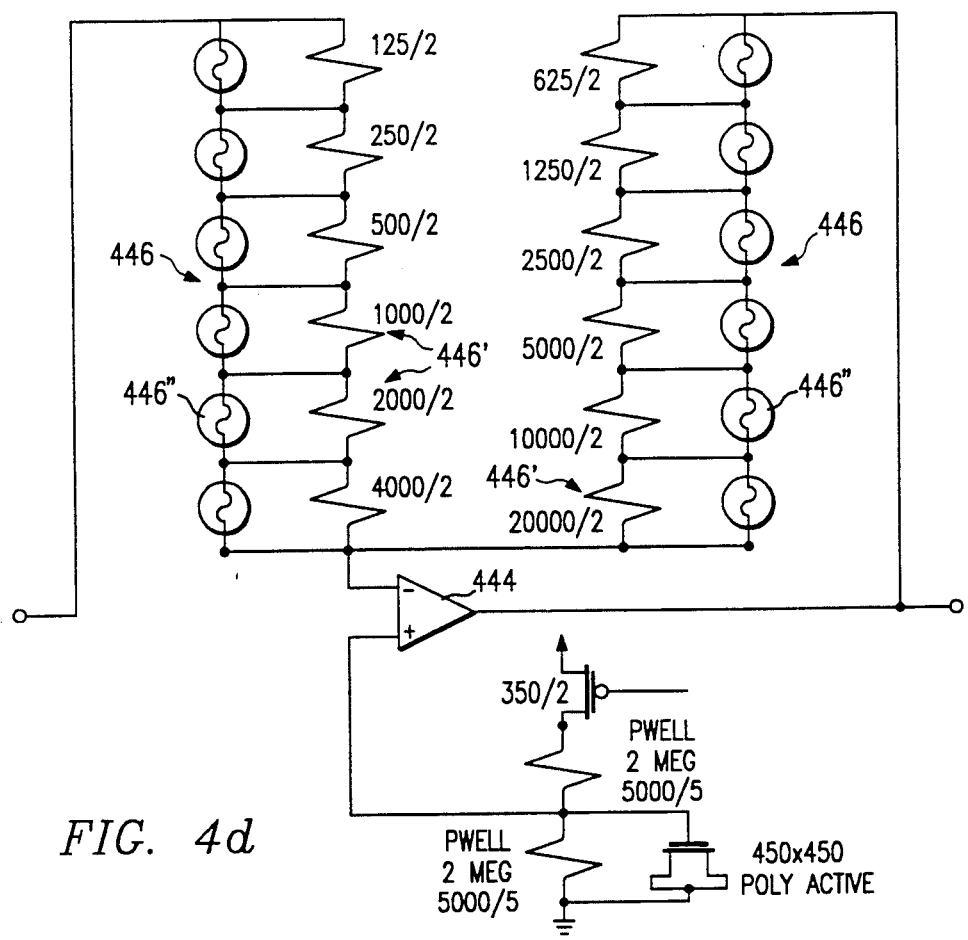
FIG. 4D shows further details of the configuration of a single amplifier stage with constant-multiplier-scaled arrays of feedback and series resistors.

FIG. 4D shows further details of the configuration of a single amplifier stage 444 with constant-multiplier-scaled arrays of feedback and series resistors. Note that the resistive elements 446' of the series resistor are scaled in powers of two, from a width/length ratio of 125 microns by 2 microns (nominal) up. The resistive elements 446' of the feedback resistor are also scaled in powers of two, but begin with dimensions of 625/2. Thus, the maximum value of the feedback resistance is five times as large as the maximum series resistance. As discussed above, this arrangement permits the resistance values to be "dialed in": once the designer has an appropriately scaled 6-bit (in this example) digital value for the resistances, he simply specifies that the fuses 446'' corresponding to each "1" bit of the resistance are to be blown. In this example, the individual resistance elements 446' are polysilicon resistors, but of course a wide variety of other device technologies could be substituted.

Figure 4F:
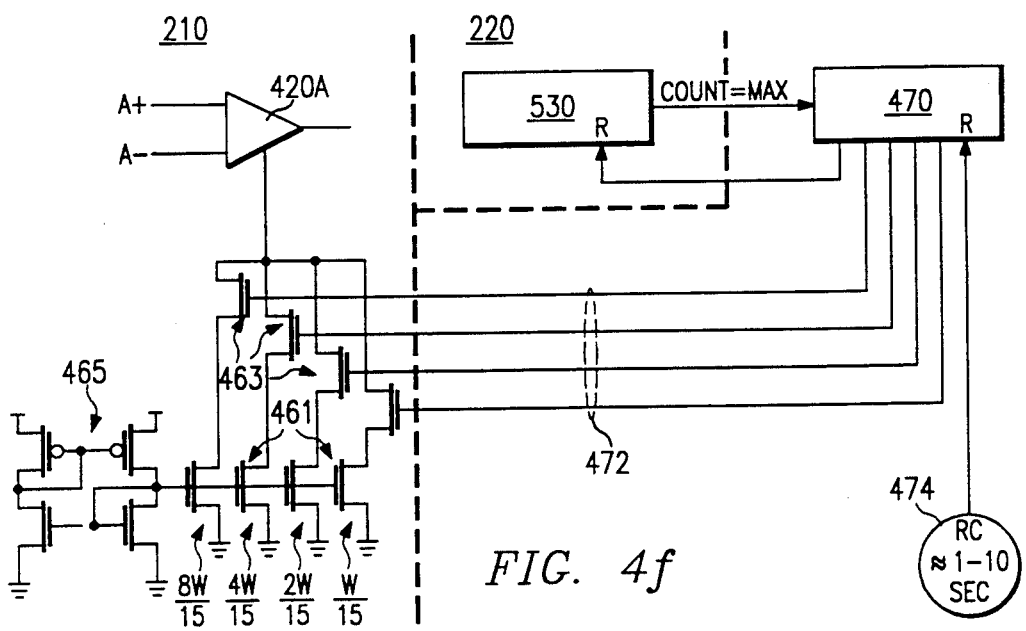
FIG. 4F shows how digital automatic gain control is performed in the receiver chip, in an alternative embodiment.
Figure 4E:
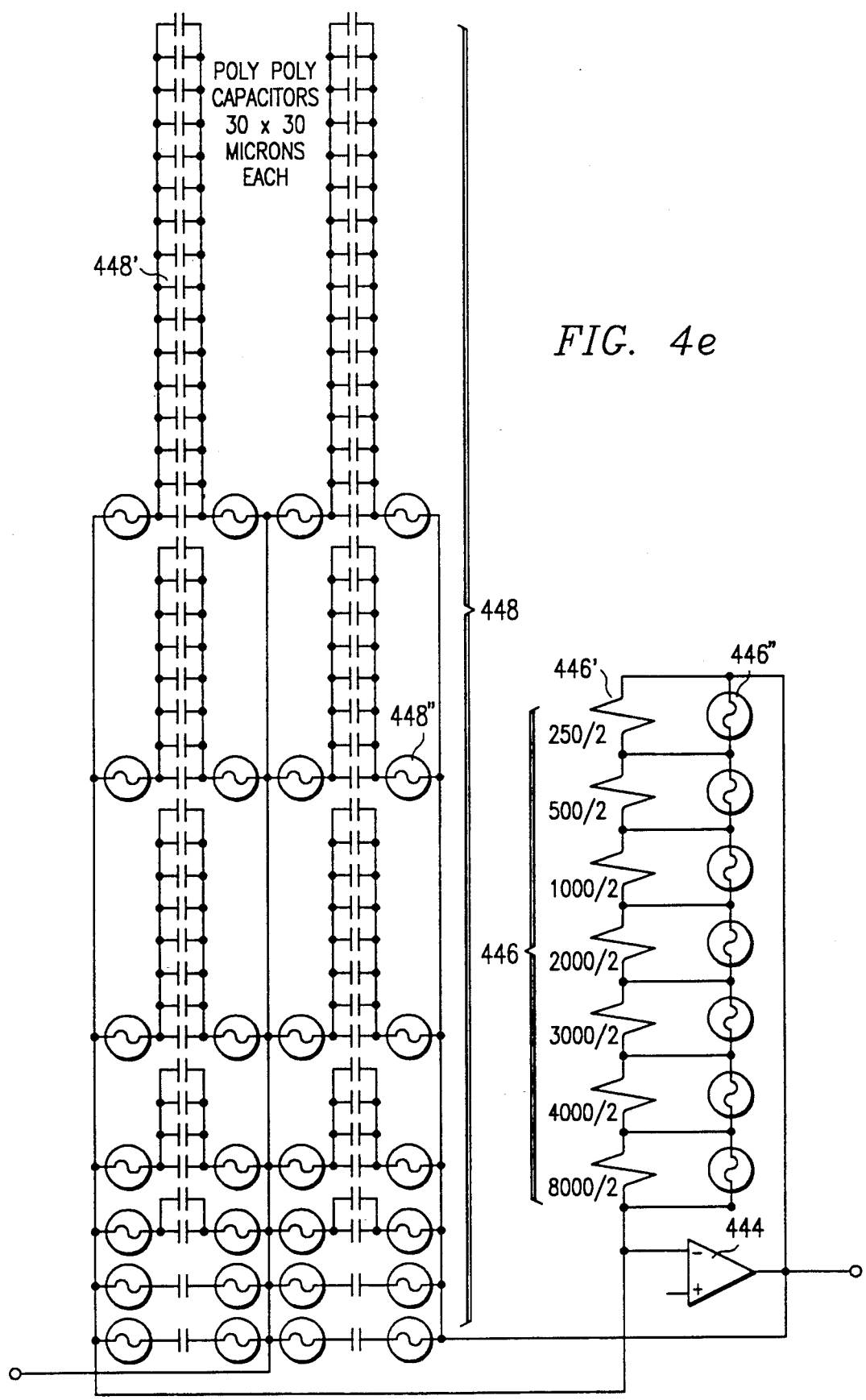
FIG. 4E shows further details of an active bandpass filter stage with constant-multiplier-scaled arrays of capacitors and feedback resistors.

FIG. 4E shows further details of an active bandpass filter stage with constant-multiplier-scaled arrays of capacitors and feedback resistors. In this drawing, each of the individual capacitor elements 448' has equal capacitance. (In this example, the individual capacitor elements 448' is a 30 micron square polysilicon-to-polysilicon capacitor, but of course a wide variety of other device technologies could be substituted.) Note that the stage shown provides a one-pole bandpass filter function, and that selection of the values of the two capacitors 448 shown and of the feedback resistor 446 can select both the center frequency and Q of this active filter.

A bandpass filter stage is used, in combination with several op amp stages. The bandpass filter stage has a Q of about 5, with minimal gain. The individual op amp stages have respective gains of about 10, for a net total gain of about 10,000 at the center frequency.

The voltage gain $V_{out}/V_{in}$ of the op amp stage will be equal to the ratio of the resistances $-R_F/R_{in}$, where the net resistance of the enabled elements of the feedback resistor is $R_F$, and the net resistance of the enabled elements of the input resistors is written as $R_{in}$.

The presently preferred embodiment provides such digitally scaled values not only for resistors, but also for capacitors. The trimmable resistors and capacitors are adjusted to set both the center frequency and Q of a bandpass filter. The mathematical relations which define the center frequency and Q of a bandpass filter as a function of the component values used are very well known to those skilled in the art. However, the use of digitally scaled selectable components, so that the desired component values can be directly "dialed in" is believed to be new in the art.

As is well known to those skilled in the art, the value of a thin film resistor can be changed by changing the width/length ratio of a layer of a given sheet resistance, by changing the film thickness of a material of a given resistivity, by modifying the thin film layer so that it has a different sheet resistance (e.g. implanting it with a dopant), or by substituting a material with a different sheet resistance. The preferred embodiment simply uses pattern modifications, to provide a variety of width-/length ratios.

The use of the bandpass filter in the analog input stages of the receiver chip 210' provides advantages of noise rejection. In the all-digital (and preferred) embodiment, noise rejection can optionally be increased by increasing the Q of the (passive) antenna circuit, or by using a filter function which includes poles at two closely spaced frequencies within the passband, or by other passive filtering options well known to those skilled in the art.

CONVERTER CHIP 220

This integrated circuit, in the portable data module 120, performs the function of 2-wire to 3-wire conversion. The one-wire bus 215 provides pulse bursts as inputs to converter chip 220. (This one-wire bus 215, together with the transmitter control output from the converter chip 220, may be regarded as a two-wire bidirectional bus.) Converter chip 220 decodes these pulse bursts, and drives serial bus 206 accordingly.

The converter chip 220, as configured in the presently preferred embodiment, is a low-power CMOS integrated circuit which accepts pulse packets at the input, and interprets these signals to control bidirectional data transfer on a 3 wire serial bus 206. The converter chip 220 also controls an output pin RFOUT, which is switched, when data is being read from the serial bus 206, in accordance with the data seen. This output pin is preferably used to control a simple VHF/UHF transmitter 240, but alternatively the RFOUT signal can be connected to gate a variety of transmitting devices.

Alternatively, the touch-contact port 270 can be connected, as a bidirectional interface, so that the converter chip 220 both receives 100 kHz pulse packets from port 270 (instead of from receiver chip 210), and also returns data to port 270 (instead of keying the transmitter 240).

The converter chip 220 also provides stretched clock and DQ signals. These signals facilitate synchronization to work with a microprocessor.

The detailed circuit implementation described below contains features which support various of the alternative embodiments discussed. However, it should be realized that these features can be omitted if desired, and in fact several of the disclosed features are not used in the preferred embodiment as presently practiced (although it is contemplated that it will be desirable to restore these features in future versions, at least for some applications).

In the presently preferred embodiment, a set of five commands is used, as detailed above. The pulse streams on the one-wire bus 215 (which are extracted by receiver chip 210 from the variable-length pulses on the 200 kHz RF channel, or are directly connected in from the touch-contact port 270) are counted. The count values are divided into classes by five boundary values B1, B2, B3, B4, and B5. In the presently preferred embodiment, boundary values B1–B5 are set at 5, 15, 25, 35, and 45, and the numbers of pulses sent by the base unit to transmit symbols A through E are 10, 20, 30, 40, and 50 respectively. The boundary values B1–B5 are independently selectable, by laser trimming, in the range from 0 to 255. Optionally, if noise margins allow, these numbers can be decreased to decrease transmit time. (For example, if boundary values B1–B5 are set at 3, 9, 15, 21, and 27, and the numbers of pulses sent by the base unit to transmit symbols A through E are 6, 12, 18, 24, and 30 respectively, the gross data rate would increase by two-thirds, if the error rate did not increase.) Alternatively, in applications where high noise is likely, these boundary values B1–B5 can be increased.

Figure 5B:
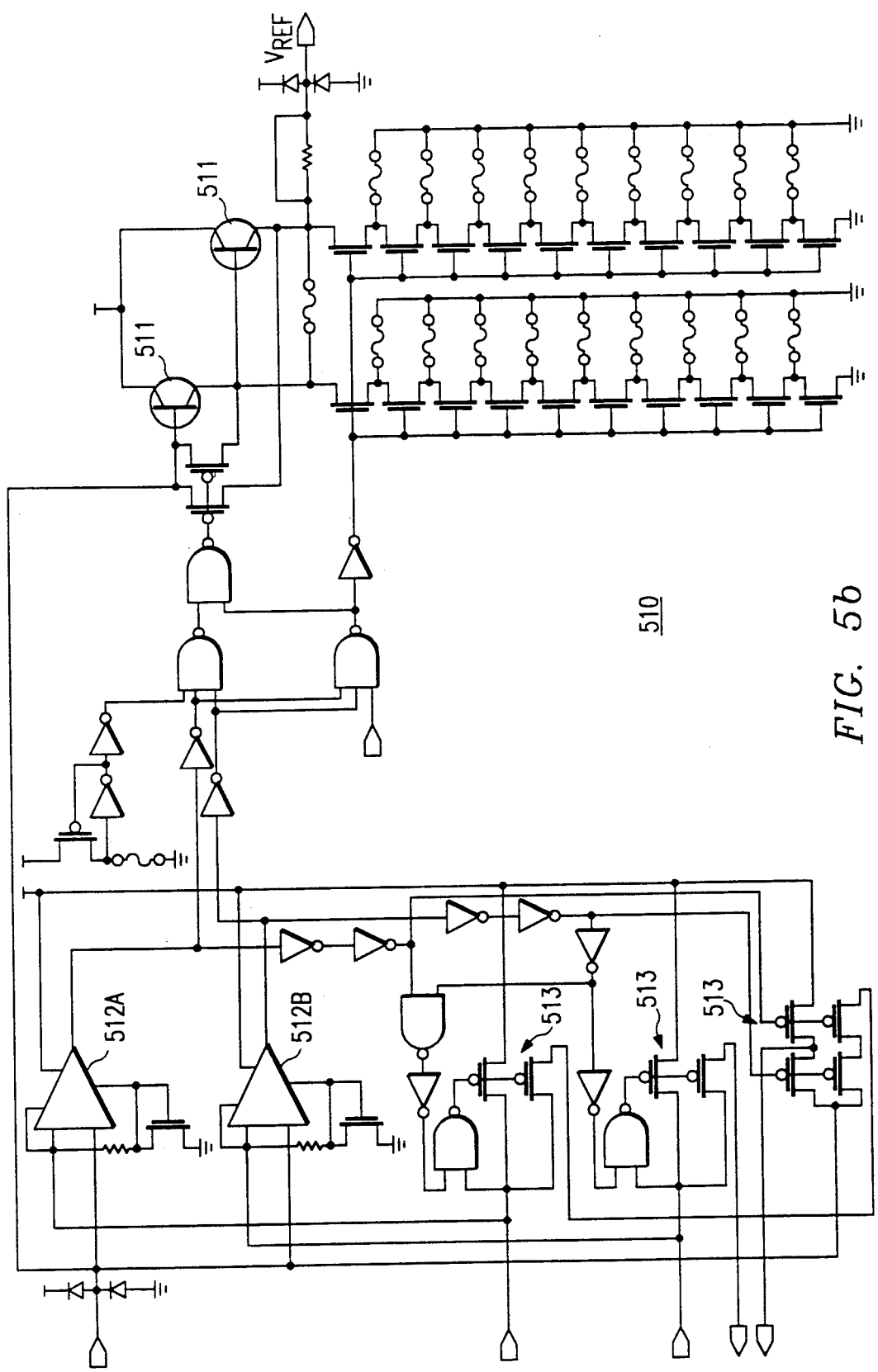
FIG. 5B shows the power switching circuit preferably used in the converter chip of FIG. 5A.
Figure 5C:
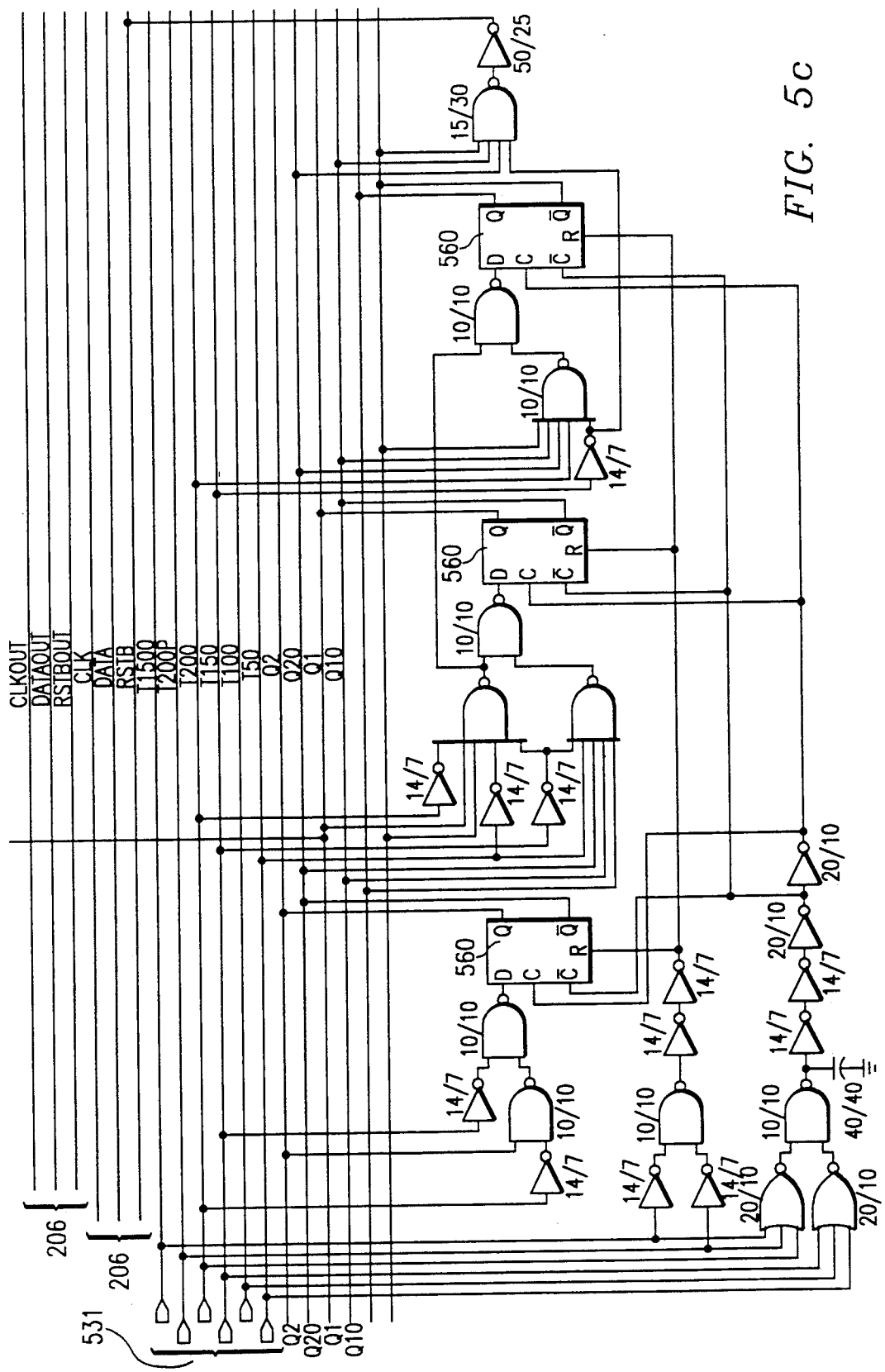
FIG. 5C shows the control logic 550 preferably used in the converter chip of FIG. 5A.
Figures 5D, 5E, 5F:
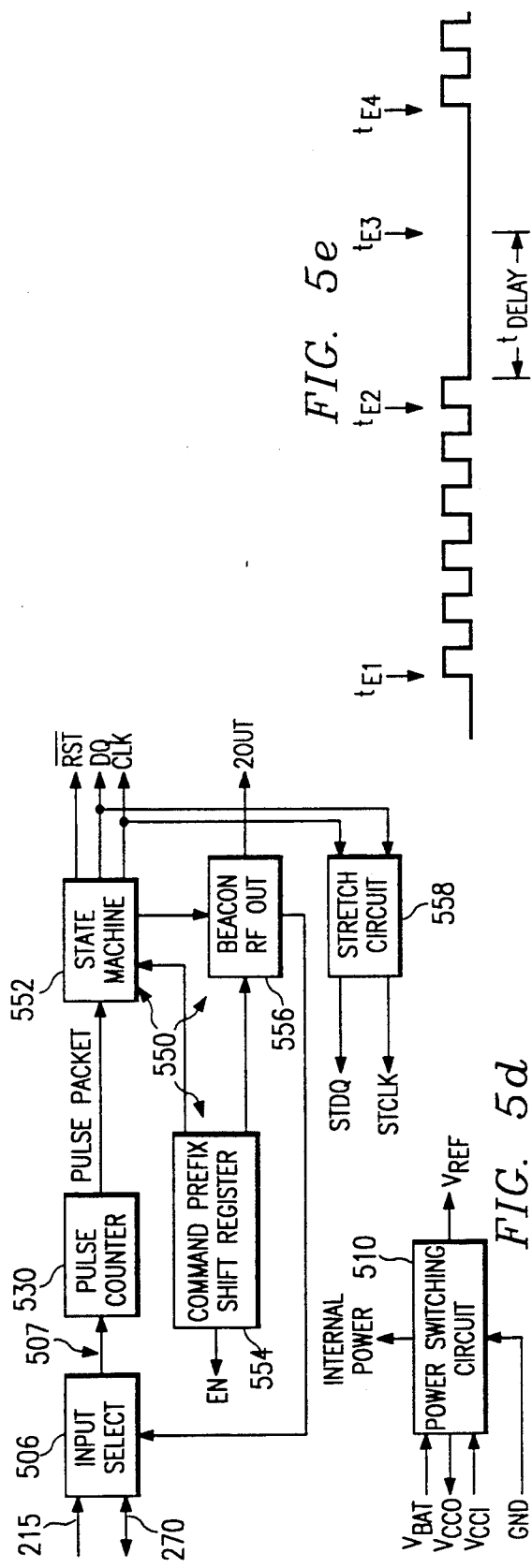
FIG. 5D shows an alternative embodiment of the converter chip of FIG. 5A, and shows separately some additional portions of the control logic 550, as well as the input select.
FIG. 5E shows the timing relations used, in the presently preferred embodiment, to implement the pulse counter 530.
FIG. 5F shows an eight-bit digital magnitude comparator which is preferably used within the pulse width detector 530.
Figure 5G:
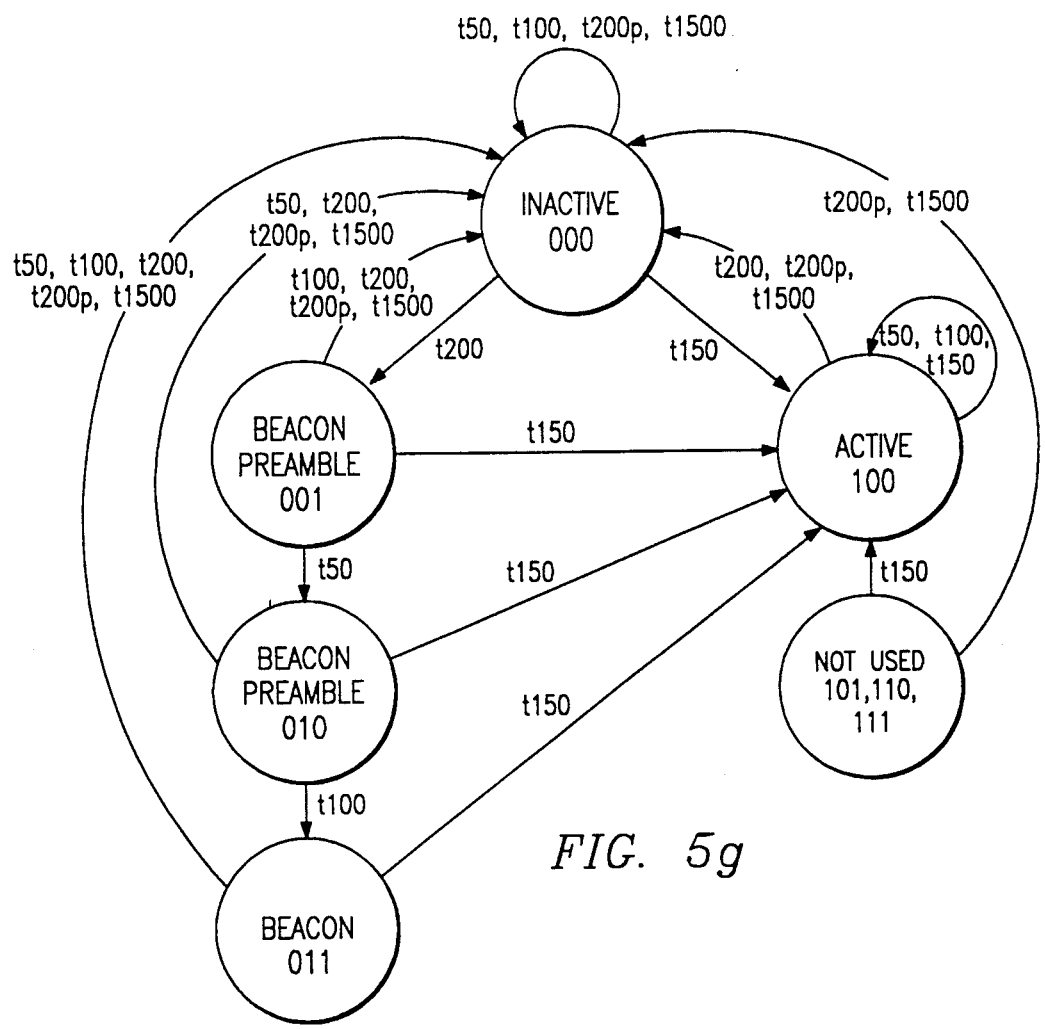
FIG. 5G shows the state diagram which is preferably implemented by the state machine 552 shown in FIG. 5D.

A state diagram of the converter chip 220 is shown in FIG. 5G. This shows how the converter chip 220 will react to all possible pulse train sequences on the onewire bus 215. This diagram can be explained in three divisions.

The first division is the inactive state (represented as 000). In this state the converter chip 220 drives lines RST*, DQ, and CLK (of the serial bus 206) low, and turns off the 300 MHz oscillator 240 (except when arriving at state 000 from Beacon state 011). Pulse classes E and F (45 pulses or more, and inactivity for 2 msec) will always send the converter chip 220 to this state. (These pulse classes are also represented as "t1500" and "t200P" in the wiring diagrams shown.)

The second division is the active state 100. In this state the converter chip 220 drives the RST* line high, pulses the CLK line, and drives data onto the DQ line (or loads data from the DQ line, depending on whether data is being read from or written to access control chip 230). The converter chip 220 will also turn on the 300 MHz transmitter 240 whenever a 1 is read out from the access control chip 230. Pulse class C (=signal t150) will always send the converter chip 220 to the active state 100.

The third division includes states 001, 010, and 011. A sequence of pulse classes DAB received by the converter chip 220 when it is in the inactive state 000 will put it into the first beacon state. In this state the converter chip 220 will pulse the 300 MHz oscillator on and off at a 5 kHz rate (laser programmable to 2.5 kHz, 10 kHz, 20 kHz, and 40 kHz). The pulsing will terminate in 200 msec or upon reaching active state 100. This beacon permits the base station's 300 MHz receiver to differentiate a valid key from background noise, when it is scanning the frequency range of 285–315 MHz looking for a key.

Once the converter chip has reached the active state 100, pulse groups A, B, and C (corresponding to internal signals t50, t100, and t150 respectively) will keep the converter chip 220 in this state. It is in this state that reading and writing of the access control chip 230 occurs. Following are the actions caused by the pulse groups A, B, and C when the converter chip 220 is in the active state 100.

A number of pulses C will cause the converter chip 220 to drive RST* low and then high, terminating any conversation with the access control chip 230 and initializing the access control chip 230 for the start of a new conversation.

A number of pulses B will keep RST* high while driving DQ and CLK so as to write a 1 to the key. The converter chip 220 will not turn on the 300 MHz transmitter, even though the access control chip 230 DO line went high, since the converter chip 220 knows data is being written to the access control chip 230.

A number of pulses A will keep RST* high while driving DQ and CLK so as to write a 0, or read data, from the access control chip 230. The combination of the write-0 and read functions decreases circuit complexity and increases the speed of communication. In order to permit this combination of functions, the presently preferred embodiment makes the pull down strength of converter chip 220 much less than the pull up strength of access control chip 230. If the access control chip 230 is expecting to be written to, it does not drive the DQ line, so that the converter chip 220 can drive the DQ line. If the access control chip 230 is being read from, it will drive the DQ line with data while CLK is low. If a "0" is read from the access control chip 230, the waveforms are identical to those above, since the converter chip 220 and access control chip 230 both drive DQ to ground. However, if a "1" is read from the access control chip 230 the converter chip 220 and access control chip 230 will contend when CLK is low, with the access control chip 230 winning. Note that out of all three cases of Write 0, Read 0, and Read 1, the only time DQ went high while CLK was low was during the Read 1. If DQ goes high while CLK is low, the 300 MHz transmitter 240 is turned on, sending a 1 to the base station 110. The 300 MHz transmitter 240 will turn itself off after about 150 microseconds. In an alternative embodiment, the transmitter 240 will also be turned off by the fourth rising edge of the 200 kHz signal presented to the converter chip 220.

Following are descriptions of some of the pin connections and signal names used in the presently preferred embodiment of this chip:

$V_{BAT}$: This input is designed to be connected to a lithium battery with a voltage range between 2.5 and 4 volts. When VCCI is grounded, the converter chip 220 acts as a battery operated device, and power is supplied from the $V_{BAT}$ pin at all times. The $V_{BAT}$ input should be grounded if not used.

VCCI: This input is designed to be connected to a power supply with a voltage range of 4.5 to 5.5 volts. This voltage input is switched to the VCCO pin as long as VCCI is greater than $V_{BAT}$. However, when $V_{BAT}$ is the greater, its voltage will be present at VCCO. When both VCCI and $V_{BAT}$ inputs are used, the converter chip 220 is in the battery operate mode until VCCI becomes greater than $V_{BAT}$. VCCI should be grounded when not being used.

VCCO: This is a switched output, which will always be the greater of $V_{BAT}$ or VCCI.

$V_{REF}$: This output pin represents the battery voltage input ($V_{BAT}$) less 0.6 Volts (at the times indicated in FIG. 8). It is designed to be connected to the battery input pin on the access control chip 230, or to such additional chips as a DS1207 TimeKey (TM) or DS1207 Electronic Tag.

PORT: This input/output pin provides an override for standard 2 to 3 wire converter. The port pin acts as an input pin for 100 kHz pulse packets containing both command and data input to the 3 wire serial port. Data is also output on the same pin when memory content is read via the 3 wire serial port.

STDQ: This output (stretched data) contains the same data as the serial port DQ pin. The difference is that the data output remains valid until the STCLK is transitioned high via an external source.

STCLK: This input/output (stretched clock) contains the same clock output as the serial port CLK pin. This pin differs in that an external source is required to drive the STCLK pin high after the converter chip 220 has asserted it high.

IN: This input accepts the 200 kHz pulse packets. In typical applications this pin is connected to the signal output pin of the receiver chip 210.

EN: This output pin is active high when the protocol shift register has received a command (including an appropriate match in the 16-bit chip-selection-tag field) to "wake-up." In a typical application this pin is connected to the enable pin EI of the receiver chip 210. In the embodiments where the duty cycle option of the receiver chip 210 is used for power conservation, this connection can be used to hold the receiver chip 210 on. The duty-cycle control logic (as will be discussed below) holds the receiver chip 210 active, during each active cycle, for at least long enough for the converter chip 220 to receive an enable command and activate this connection. This assures that, even in the maximum-efficiency duty cycle mode, it will be possible to detect an enable pulse and wake-up.

TRI: This input is used to tristate outputs CLK, RST*, and DQ. The TRI pin is active in high state.

DQTRI*: This input is used to tristate the DQ pin only. The DQTRI pin is active in the low state.

OUT: The OUT pin carries the data which is output from the 3 wire serial port. In a typical application this pin is used to key the RF transmitter which will send data back to a base station 110 via a 300 MHz loop.

RST*: This output signal is the reset-bar signal for the 3 wire serial bus 206. When RST* is at high level, the 3 wire port is active, and data can be written into or read from the serial bus.

CLK: This output signal is the clock signal for the 3 wire serial bus 206. This signal times data into and out of the DQ line of the 3 wire serial bus 206.

DQ: This input/output is the data input/output for the 3 wire serial port. In a typical application, RST*, CLK, and DQ connect directly to the RST*, CLK and DQ pins on the access control chip 230, memory controller chip 260, data converter chip 220, or such other circuits as a DS1207 TimeKey (TM) or Electronic Tag.

GND: This pin is the ground pin for the converter chip 220.

FIG. 5D shows a high-level overview of an alternative embodiment of the converter chip 220. This embodiment differs from the embodiment of FIG. 5A in two major respects:

The alternative embodiment of FIG. 5D does not have a 20 kHz input. Thus, this embodiment is suitable for embodiments where the low-frequency-wakeup protocol described above is not used.

This alternative embodiment also differs from the embodiment of FIG. 5A in having the ability to enter (and awaken from) a sleep mode. A corresponding hardware difference is that this alternative embodiment has a protocol register 554.

In the organization shown in FIG. 5D, the input select logic 506 selects between inputs from the data line of one-wire bus 215 and port 270. (Note that this logic can also divert the output of the beacon control logic 556 to provide an output to port 270 instead of to the transmitter 240.) The pulses from the selected input are provided to pulse counter 530, where they are deciphered into various action codes which affect the protocol shift register, the state machine, and ultimately the 3 wire serial bus 206.

When a signal is coming in over the write-data channel, the pulse packets received by the pulse counter 530 will have approximately a square-wave shape at 200 kHz, with a 50 microsec dead time after the last pulse in each packet. The pulse counter logic 530 watches for such dead time intervals, and then assesses the count value to determine what action to be taken, in accordance with the threshold values B1-B5. In addition, if the input to the pulse counter 530 is low (inactive) for longer than 2.0 msec, the converter chip 220 will timeout, reset the protocol shift register 554, and place the state machine 552 into an inactive state.

If a signal is incoming from the touch-contact port 270, the operation of the converter chip 220 is modified slightly. Due to the lower frequency used for communication over the port 270, all time windows are doubled (except that the limit for timeout is kept at 2000 microseconds). If a read pulse packet is detected, time is allotted beyond the 100 microsec between pulse packets for the converter chip 220 to send out a one or a zero. This time is specified as a 400 microsec window. If a logic "0" is being sent, the port line will remain low for the entire window. If a logic "1" is being sent, the port line will be driven high within a maximum of 150 microsec. The port line is guaranteed to be inactive after a third 150 microsec time period.

Note that the specific circuit embodiment which will now be described does support the use of the 16-bit chip selection field, which, as mentioned above, is a desirable alternative not used in all embodiments. Those skilled in the art will readily recognize how this additional functionality can be disabled or designed out.

The pulse counter 530 will direct the interpretation of each packet of input pulses to one of two circuits. If a pulse packet of more than 44 pulses (i.e. a "50-pulse" packet) arrives at the pulse counter 530, the next 24 pulse packets are sent to the protocol shift register 554, and the state machine 552 is set inactive. (Thus, a 50-pulse packet always sets the state machine to inactive, regardless of any action which may have been occuring. This packet can be used to about a current action/conversation.) The 24 pulse packets following a 50-pulse packet, which are routed to the protocol shift register 554, can command a normal wakeup, a masked wakeup, a read of the chip-select bits, a write of the chip-select bits, or a lock of the chip-select bits. The chip-select bits (in an incoming command) are the first 16 bits of the 24-bit protocol shift register 554. The last eight bits are the function field.

The state machine 552, which implements a state diagram as described above, receives inputs from the protocol shift register and also from the pulse counter 530. The outputs of the state machine control the three lines RST*, D/Q, and CLK of the serial bus 206. Another output of the state machine 552 also activates the beacon control logic 556, which provides outputs to the transmitter 240 and to the multiplexer (input select logic) 506. The state machine 552 can also use the D/Q line as an input.

The D/Q and CLK lines are also connected to stretch circuit 558, which generates STDQ and STCLK signals as described above. The STCLK and STDQ pins are similar to the CLK and DQ lines: when CLK goes low, the STCLK line is also pulled low by the converter chip 220. This signal tells a monitoring device (such as a microprocessor) that the STDQ pin contains data, and that this data matches the data on the normal DQ pin. When the normal CLK goes high, however, STCLK and STDQ both remain valid. This allows time for a monitoring device to capture the data. Once the monitoring device retrieves data, the STCLK signal must be forced to a high level externally. In this manner the monitoring device will terminate the cycle, and the STDQ line will go to high impedance.

A power switching circuit 510 selects between alternative power supply inputs $V_{BAT}$ and VCCI, to supply the internal power supply $V_{DD}$ and a supply voltage output VCCO. This circuit also supplies a lowered supply voltage output $V_{REF}$, which provides power to certain downstream chips as discussed above. (The use of this reduced-voltage output means that, when the converter chip 220 drives the RST* line to full supply voltage, the downstream chips which use the $V_{REF}$ output for their battery supply voltages will see an RST* voltage which is higher than their supply voltages.)

FIGS. 5A-5C show a much more detailed circuit diagram. Note that the protocol shift register 554, state machine 552, stretch circuit 558, and beacon control logic 556 are all shown implemented as control logic 550 in FIG. 5A. For clarity, clock lines and miscellaneous timing logic (such as clock generators) are not separately shown.

Input buffers 502 receive incoming signals 507, 20KP (used, in alternative embodiments, to indicate that the receiver chip 210 is receiving a signal on the wakeup frequency), DQ, DQOE, and TRIWIR. Output buffers 504 buffer output signals DQ, CLK, and EN.

Counter logic 530 receives the data from line 507 (which will usually be connected to the data line of the bus 215), and also receives the 20KP signal (which indicates when the currently incoming data was received on the wakeup frequency rather than the write-data frequency).

The incoming digital pulses are expected to have symmetrical high and low durations of about 2.5 microsec ($\pm 20\%$). The minimum quiet time required for the converter chip 220 to recognize the end of one pulse packet and the beginning of another is 50 microsec. Conversely, if another pulse occurs after less than 10 microseconds of quiet, this pulse can be recognized as a continuation of the previous packet. If an idle period (with no pulses) of 2.0 msec occurs, the protocol shift register 554 will initialize and the state machine will go inactive. Quiet intervals of about 100 nsec or less may not even be noticed by the converter chip 220. Pulse packets range from 10 pulses to 50 pulses, depending on the action to be taken. If a read pulse packet is detected, data is to be read from a device connected on the 3 wire serial bus 206, and the output pin will become active high for a logic one or remain low for a zero. Time is allotted beyond the 50 microsec between pulse packets for the converter chip 220 to send out a one or a zero. This time is specified as a 225 microsec window. If a logic "1" is being sent, the out pin will be driven to high level within a maximum of 75 microsec and will remain high for a minimum of an additional 75 microsec. However, if a minimum of four 200 kHz pulses are received at the 200 kHz input, the RFOUT pin activity is terminated on the assumption that a logic one has been received and the sending unit has started the next pulse packet. The RFOUT pin is guaranteed to be inactive after a third 75 microsec time period.

When counter logic 530 detects a gap of 50 microseconds or more, which would indicates the end of a pulse packet, the counter 530 drives a data-valid line DV, compares the current count value against various threshold values, and updates the threshold output lines 531. Note that lines 531 are not simply counter output bits, but represent the results of multiple comparison tests. As noted above, the boundary values B1-B5 are separately laser-programmable, and the lines 531 represent the separate logical results of magnitude comparisons between each of these boundary values and the count value for the latest completed pulse packet. The counter 530 also provides another output (not shown), indicating that a quiet delay long enough to cause timeout (set to 2 msec, in the presently preferred embodiment) has been detected.

Wakeup logic 520 receives the highest bit of the comparison bits 531, and also receives the signal 20KP to detect activity on the wakeup frequency. Wakeup logic 520 performs the wakeup-frequency decoding mentioned above. This capability is used in the alternative embodiment which uses the more sensitive receiver chip 210' of FIG. 4C, with signalling on a lower wakeup frequency used to initiate all transactions. When the module 120 is in standby mode, signals received on the wakeup frequency are amplified by receiver chip 210, to provide pulse bursts on the one-wire bus 215. Converter chip 220 counts pulses in the pulse trains of the wakeup-frequency signal, in a manner which is analogous to its operation for pulse trains received on the write-data frequency. (However, note that, when the pulse packets are derived from a wakeup signal, the individual pulses will have a high-state duration which is equal to half the period of the RF carrier at the wakeup frequency, instead of half the period of the RF carrier at the write-data frequency.) The converter chip 220 counts these pulses, and measures them against a pulse count boundary B0. A stream which has fewer pulses than B0 is considered a "0", while greater than or equal to B0 pulses is considered a "1". The value of B0 (like that of boundary values B1-B5 discussed below) is laser trimmable from 0 to 255. If no laser trim is used, B0 will be equal to 20. In the present system, 10 pulses will be used to send a 0, and 30 pulses to send a 1 with B0 set at 20. (Optionally, if noise and error margins allow, these numbers can be decreased to decrease transmit time). The converter chip 220 looks at a moving window of bits received at 20 kHz as described above. When the last bit of a pattern B9 (10111001) is received, the converter chip 220 will enable the 200 kHz receiver of the receiver chip 210. When the last bit of a pattern 6D(01101101) is received, the converter chip 220 will disable the 200 kHz receiver of the receiver chip 210. If no 20 kHz or 200 kHz signal is received by the converter chip 220 for at least 2 msec, the converter chip will disable the 200 kHz receive operation.

FIG. 5B shows details of the power switching circuit 510. Note that this circuit can actually accommodate two system supply voltage inputs VCCI, in addition to the battery voltage input $V_{BAT}$. Comparator 512A tests supply voltage input $VCCI_1$, to see whether it is greater than the battery voltage $V_{BAT}$. Comparator 512B tests supply voltage input $VCCI_2$, to see whether it is greater than the battery voltage $V_{BAT}$. The large switching transistors 513 are controlled in accordance with the logical outputs of these comparators:

If voltage $VCCI_2$ is greater than the battery voltage $V_{BAT}$, then the onchip supply voltage $V_{DD}$ and the supply voltage output VCCO will both be connected to $VCCI_2$ and disconnected from $VCCI_1$ and $V_{BAT}$.

If voltage $VCCI_1$ is greater than the battery voltage $V_{BAT}$ AND voltage $VCCI_2$ is NOT greater than the battery voltage $V_{BAT}$, then the on-chip supply voltage $V_{DD}$ and the supply voltage output VCCO will both be connected to $VCCI_1$ and disconnected from $VCCI_2$ and $V_{BAT}$.

If neither voltage $VCCI_1$ nor voltage $VCCI_2$ is greater than the battery voltage $V_{BAT}$, then the on-chip supply voltage $V_{DD}$ and the supply voltage output VCCO will both be connected to $V_{BAT}$ and disconnected from $VCCI_1$ and $VCCI_2$.

The capability to use two alternative power supply inputs, in addition to the battery voltage input, helps to allow system flexibility. Moreover, this is a desirable safety feature, since it helps to minimize the risk of cross-connection of separate power supply sources (which could cause damaging high currents), without wasting power in diode drops.

The reduced-voltage output supply $V_{REF}$ is generated by one or two bipolar transistors 511. (The second transistor is connectable, by a laser option, to provide a Darlington pair.) As noted above, this provides a $V_{REF}$ output which is about one diode drop (or two, depending on the laser option just mentioned) below the on-chip supply. However, to minimize power dissipation in these bipolar transistors, logic is used to condition the $V_{REF}$ signal so that $V_{REF}$ remains equal to $V_{BAT}$, unless the reset signal goes high and both the system supply voltage inputs $VCCI_1$ and $VCCI_2$ are low.

The configuration shown is also advantageous for safety reasons. In embodiments like that shown in FIG. 2D, where a data cartridge can be externally powered during fast readout operations, conflicts between the two power supplies must be avoided. For example, Underwriters' Laboratory (UL) rules require that, in a system which has both a battery supply and a connection to receive external power, two elements must go bad before the battery can be directly charged by the external power supply. (This rule is intended to avoid catastrophic failure due to overcurrent and/or overvoltage in the battery.) One element which can be used to protect the battery is a substantial series resistance, e.g. 5 or 10 kilohms, in series with the battery. However, this series resistance cannot be used when the device is actually being powered by the battery. Thus, in the embodiment of FIG. 5B, the control signal to switch power supply sources is first tied to the gate of the device which switches in the battery. If VCCI is less than $V_{BAT}$, the battery will not be charged. If VCCI is greater than $V_{BAT}$, the gate of the battery-switching device will be high. If a failure occurs, so that the gate of the battery-switching device goes low, the resulting voltages will ripple through the circuit to the $V_{cc}$-switching device, and turn it off.

The converter chip 220, in the presently preferred embodiment, can work off of a battery supply as low as 2.5 volts. However, if an alternative supply is available, it can be connected to the $VCCI_1$ or $VCCI_2$ inputs. (To avoid disturbing the switching transistors 513, any unused supply input VCCI should preferably be grounded.)

FIG. 5C shows the presently preferred embodiment of the state machine 552. Note that three outputs of the state machine control the bus 206. (Three other lines are assigned to receive signals from the serial bus 206.) The RST* pin on the serial bus 206 is driven high whenever a 30-pulse packet is received by the state machine. The RST* signal remains high until a 40- or 50-pulse packet is received, or until 2.0 msec has elapsed without activity at the 200 kHz input. The CLK pin on the converter chip 220 is normally low, and will remain low until the RST* signal goes high. When RST* goes high, and a 10- or 20-pulse packet is received by the state machine (indicating a "read from" or "write to" the 3 wire port), the CLK pin is driven low for a period of 500 nsec minimum to 1 microsec maximum. If data is being read from a device on the 3 wire serial port, it will become valid within 200 nsec of the falling edge of the clock, and remain valid until the clock returns high. This data is transferred to the RFOUT pin after a time delay of 75 microsec maximum. The output will be a high level for a logic one or remain at low level for a logic zero. If data is being written to a device on the 3 wire serial port, then data will be sent from the state machine to the DQ line on the falling edge of the clock. This data will remain valid beyond the time when the clock transitions back to the high level. The RFOUT pin remains low while data is being written to the 3 wire serial port. Note that, if multiple addressable devices are to be attached to the serial bus 206, some sort of addressing protocol will have to be added.

The state machine includes three flip-flops 560, which implement the 8-state diagram of FIG. 5G. Note that inputs on lines E or F (signals t200p and t1500) reset the flip-flops 560, and all other inputs clock the flip-flops. Reset logic 562 generates an output signal on line RST* (of bus 206) under the appropriate conditions. Two oneshots are also provided, to drive pulses, under the appropriate conditions, onto lines CLK and DQ of bus 206.

FIG. 5E shows the timing relations used, in the presently preferred embodiment, to implement the pulse counter 530. A rising pulse edge (of the pulses derived from the one-wire bus 215) resets the counter (at the time shown as $t_{E1}$), and causes a decode enable signal to go low. When the pulse burst ends (i.e. at time $t_{E3}$ when no further rising edges have been seen for a predetermined delay time $t_{DELAY}$ after the last rising edge time $t_{E2}$), the decode enable signal is again brought high. (The delay $t_{DELAY}$ provides setup time, so that the count value, which has been valid since the rising edge of the last pulse, can ripple through the magnitude comparators.) When the next rising edge occurs, at time $t_{E4}$, the decode enable signal will again go low.

FIG. 5F shows the magnitude comparator which is preferably used in the pulse counter 530, to rapidly threshold the pulse-count values against the preset thresholds. Note that this is a ripple-through architecture, where the highest boundary values are tested first. The small cell which is used at each stage provides both "greater than" and "equal to x" outputs. Only three stages are shown, although eight stages are used in the presently preferred embodiment (and of course more or fewer stages could be used instead).

Figure 8:
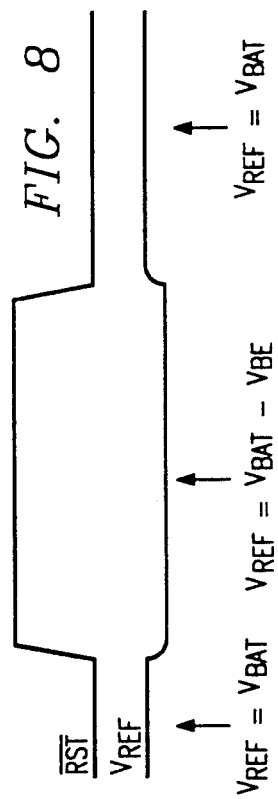
FIG. 8 shows how the converter chip, in the presently preferred embodiment, controls its power-supply output line to help other chips receive data from the serial bus.

FIG. 8 shows how the converter chip, in the presently preferred embodiment, controls its power-supply output line to help other chips receive data from the serial bus. Note how the $V_{REF}$ output is driven opposite to the RST* signal.

ALTERNATIVE EMBODIMENT: USE OF CHIP SELECTION BITS FOR MASKED WAKEUP

The logic which permits the base station 110 to identify which portable units are nearby, and to access a desired nearby portable unit, will now be described.

NORMAL AND MASKED WAKEUP

The only difference between normal wakeup and masked wakeup is the number of chip-select bits which must be matched to wakeup the state machine. For example, if a function code indicates the use of all chip-select bits, then all 16 bits must be correctly matched to enable the main state machine. The following step by step procedure will illustrate normal and masked wakeup.

1. First a 50-pulse packet is sent to the IN pin which puts the state machine into an inactive state.
2. Issue a wakeup or masked wakeup command, by sending the 8 bit function code followed by the 16 chip-select bits which are proper to enable the state machine. The protocol register is always loaded by sending write zeroes (10-pulse packets) or write ones (20-pulse packets). The loaded pulse packets are compared to values stored in the 8 bit function Code Table and the previously stored 16 chip-select bits (storing the chip-select values will be covered later). When masking is being used, the first entered bits (LSBs) are the last to be masked. For example, Bits 0 and 1 will be the only bits unmasked if "mask 2-15" is selected. Pulse packets of 25 to 44 pulses are ignored when loading the protocol shift register 554. A pulse packet of greater than 45 pulses always initializes the protocol shift register 554 back to starting with the LSB and aborts any previous transaction. The state machine is also set inactive. After the first 24 bits are received and a valid wakeup is decoded, the protocol shift register 554 will no longer allow data bits to be written into it and the enable output will become active and remain active until another 50-pulse packet is received to reinitialize. Subsequent pulse packets which are received will be directed to the state machine with action taken corresponding to the number of pulses received as shown in Table 1.
3. A pulse packet train of 40-pulse packet, followed by a 20-pulse packed, followed by a 10-pulse packet enables the beacon mode of the state machine. Beacon mode turns on and off the out pin at a 5 kHz rate for 100 msec. This signal can be used (for example) to key a transmitter, which allows a base station 110 to lock onto the transmitted beacon.
4. The converter chip 220 is now put into the active state by issuing a 30-pulse packet which takes RST* high on the 3 wire serial port. This same 30-pulse packet also turns off the beacon if it has not already timed out. With reset high a conversation can now take place between devices placed on the 3 wire port (such as Access control chips 230, memory controller chips 260, or such other circuits as a DS1207 TimeKey (TM) or Electronic Tag) from the 200 kHz input and data is returned to the sending unit via the out pin. As 200 kHz pulse packets continue to be received, the devices attached to the 3 wire port will be written and read using 10-and 20-pulse packets and reset with a 30-pulse packet. When data is read from the 3 wire port, it is always sent to the out pin for transmission back to the sending 200 kHz unit.
5. If a 200 kHz 40-pulse packet is received, the state machine will go to an inactive state but still remain alert for new 200 kHz pulse packets.
6. If no 200 kHz pulse packets are received for more than 2.0 msec, the converter chip 220 will time out, initialize the protocol shift register 554, and set the state machine back to the inactive state. The converter chip 220 now waits for new 200 kHz inputs to the protocol serial shift register which begins with a 50-pulse packet.

READING THE CHIP-SELECT BITS

The 16 bit CS value stored in the protocol shift register 554 can be determined in several ways. In fact, an exhaustive search could be implemented with a trial and error method which would eventually eliminate all but the correct bit pattern. Obviously, this method is painfully slow as $2^{16}$ possible combinations may need to be tried. In a similar but much more expedient manner, mask bits can be used in a successive approximation manner to determine the value of the CS bits. This procedure is accomplished by gradually increasing the size of the unmasked chip-select fields as each set of bits are identified. However, the simplest method of determining the 16 bit CS value is to read the 16 bit value directly. The following step by step procedure will illustrate how to read the chip-select bits.

1. Wakeup the converter chip 220 using the mask-all function code. This is accomplished by sending a 50-pulse packet followed by 24 10-pulse and 20-pulse packets. In the protocol used, the least significant bits are transmitted first. The command format preferably used therefore transmits the command code for the desired action first. Thus, in this example, the first 8 pulse packets must match the mask-all function code. The next 16 packets, which are the chip-select field, may be any combination of 10- and 20-pulse packets (since the 16 CS bits are masked). Next, the beacon mode of the state machine is enabled by sending a 40-pulse packet followed by a 10-pulse packet followed by a 20-pulse packet. The beacon mode must be enabled when using an RF link with a scanning receiver, as the beacon will allow the receiver to lock on to the transmitter frequency. If the port pin is used directly or if the out pin is read directly or indirectly by a non-scanning device, this step can be omitted. Finally, if the beacon mode has been enabled, it should be disabled after receiver lock on by sending a 30-pulse packet to the IN pin.
2. Now load the converter chip 220 protocol shift register 554 with the read-CS-bits function code. This is accomplished by sending a 50-pulse packet, followed by 24 10-pulse and 20-pulse packets. Again, the first 8 pulse packets must match the read CS bits function code, but the next 16 pulse packets may be any combination of 10- and 20-pulse packets. During the 24 bit protocol shift register 554 load, pulse packets of 30 and 40 pulses are ignored. As usual, pulse packets of 50 pulses will initialize the protocol shift register 554 and set the state machine inactive.
3. If the 8 bit function code in the protocol shift register 554 is correctly matched, the next 16 bits will be read at the out pin for each 10-pulse packets (read) at the IN pin. If more than 16 read pulse packets are sent to the IN pin in this mode, the converter chip 220 will start over again reading the CS bits, beginning with the first bit. Pulse packets of 20, 30, or 40 pulses are ignored, and 50-pulse packets will initialize the protocol shift register 554 and set the state machine inactive.
4. During the entire CS bit read operation, the state machine is disabled. All pulse packets except the 50-pulse packet are ignored. As usual, the 50-pulse packet or a time-out of 2.0 msec will initialize the protocol shift register 554 and return the state machine to inactive.

STORING THE CHIP-SELECT BITS

In order to store a new value into the chip-select bits of the protocol shift register 554, it is necessary to know the existing stored value. In addition, if the lock bit is set, a new value for the chip-select bits cannot be stored unless power is removed and reapplied. The lock function is only useful in applications where power is permanently applied or removed by exception. The existing value of the CS bits should be obtained using the "Read Chip-select Bits" described earlier. After obtaining the existing chip-select values, a new value can be entered by using the step by step procedure which follows.

1. Load in the proper 24 bit pattern into the protocol shift register 554 for storing the chip-select bits. This pattern consists of 24 10-pulse and 20-pulse packets. Any 30- or 40-pulse packets will be ignored. As always, 50-pulse packets will initialize the protocol shift register 554 and set the state machine inactive.
2. If the 8 bit function code and the 16 CS bits are correct, the next 16 pulse packets will store a new CS value, overriding the old CS bits. Only 10-pulse and 20-pulse packets are accepted. Larger pulse packets are ignored, and 50-pulse packets cause the stored CS value to abort, initializing the protocol shift register 554 and return the state machine to inactive. The converter chip 220 does not lock up after 16 pulse packets are sent in this mode. If more packets are sent, the new packets will continue to shift in, storing the last 16 packets that are received.
3. During the entire store CS bits operation, the main state machine is disabled. All pulse packets received will have no effect on the state machine except the 50-pulse packet, which will initialize the protocol shift register 554 and return the state machine to an inactive state. A time-out of 2.0 msec will have the same effect as a 50-pulse packet.

LOCKING THE CHIP-SELECT BITS

The design of the converter chip 220 allows for both battery backup and battery operation. The device also consumes only modest amounts of power. As a result, most applications for this device are permanently powered and memory elements within the device, like the protocol shift register 554 CS bits, are nonvolatile. A special latch is provided so that upon initial power up (when battery is first connected) the nonvolatile chip-select bits can be written with a store CS function code. The CS bits can be changed as often as desired, using the store function until a lock CS function code is issued. Once sent, the value of the chip-select bits cannot be changed until power is removed (battery disconnected) from the converter chip 220. The lock CS bit can be accomplished by the following step by step procedure.

1. If the CS value is unknown, the procedure for reading the CS bits should be followed so that the value is known.
2. The 8 bit function code for locking the CS bits is then transmitted, followed by the 16 bit chip-select value, using 10- and 20-pulse packets. Only 10- and 20-pulse packets are accepted, and 30- and 40-pulse packets are ignored. A 50-pulse packet will cause the lock CS bits to abort, initializing the protocol shift register 554 and returning the state machine to the inactive state.
3. Once the 24 bit protocol shift register 554 is loaded with an exact match for the CS bits and the lock CS function code, the latch is set automatically and no further action is required.
4. The only way the latch can be reset is to remove power (the battery) from the device. During the lock-CS operation the main state machine is disabled, so that all pulse packets have no effect on the state machine. As usual, a 50-pulse packet or a time-out of 2.0 msec will initialize the protocol shift register 554 and return the state machine to inactive.

DIGITAL AGC FEEDBACK

The presently preferred embodiment does not include any automatic gain control circuits (AGC) stages, although these are frequently used, and recognized as being useful, in RF communication systems. Normally AGC is implemented using analog amplification stages, which are controlled by feedback to reduce their gain when large incoming signals are overloading subsequent circuits. As noted above, the micropowered receiver circuits of the presently preferred embodiment do not use any analog amplification, since such circuits tend to consume power.

However, an alternative embodiment, shown in FIG. 4F, uses a digitally controlled automatic gain control, which does not consume any additional power. This is very advantageous, since it reduces the risk of short-range RF communications being disrupted in high-noise environments, or in environments where a remote module can hear multiple base stations.

In the primary preferred embodiment, when the counter 530 receives an extremely long pulse train it simply saturates at its maximum count value (255 in this embodiment). However, in this alternative embodiment, the counter 530 provides an overflow-indicating pulse to a current-source-control counter 470. This current-source-control counter provides control signals to a split current source in the comparators 420 at the input to the receiver circuits.

The current source in the input comparators in the receiver circuits is the primary location of standby power dissipation in the presently preferred embodiment. Therefore, the size of this current source is a critical parameter in designing the remote module: if the comparators are redesigned to draw more current, the sensitivity of the receiver circuits will be increased, but the battery lifetime will be decreased. Thus, in the presently preferred embodiment (using a 190 mA-hour battery), the current sources have been designed for the maximum current draw which can reliably be accommodated by the battery lifetime. (As mentioned above, this current draw is a few microAmps total.) In the presently preferred embodiment, these current sources are conventionally configured using a CMOS current mirror circuit which controls an NMOS driver (current source) device.

These considerations indicate a maximum size for the current source, but do not indicate a minimum size. Therefore, in this alternative embodiment, the channel width of the current source device is divided up between several devices in parallel. For example, where the maximum device width is W, this device width can be allocated into four parallel current-source devices 461 having widths of W/15, 2W/15, 4W/15, and 8W/15. (Alternatively, of course, the total width can be divided up differently, to achieve whatever relation between digital control input and the analog sensitivity is desired.)

Thus, this embodiment provides a significantly different current source for the comparators 420. The individual driver elements are each driven by the voltage output of a current-mirror circuit 465, just as the single driver element is in the current source of the primary embodiment. A switching transistor 463 is placed in series with each of these current-source devices 461, and a four-bit down counter 470 is used as the current-source-control counter. The four output bit lines 472 of the current-source-control counter 470 are each connected to one of these switching transistors, to control one of the current-source devices. In the presently preferred embodiment, the current source device sizes are chosen so that the maximum current into the comparator is about 1.5 microAmps.

The effect of this is that the multiplier, defined by the ratio of the current-source device to the pull-down device in the current mirror, will be changed (as is well known to those skilled in the art of MOS circuit design) as the separate branches of the current-source device are switched in or out. For example, if the input side of the current mirror receives a current of one microAmpere, and drives this current through an NMOS device which is 5 microns wide and has its gate tied to its drain, the gate of this device can be connected to control the gate of a following NMOS device (with the same threshold voltage, gate oxide thickness, etc.), which will provide a current source. (The amount of current from this current source will be equal to the current on the input side of the current mirror, multiplied by the ratio of the widths of the two devices.) Therefore, in this example, the voltage from the input side of the current mirror can be used to control as many NMOS devices in parallel as desired. Each of these NMOS devices will source a current (into sufficiently low impedance) of 1 microAmpere times its width (in microns) divided by 5.

Thus, when the main counter saturates, the current-source-control counter is decremented, and the total channel width of the current sources in the input comparators 420 of the receiver circuits is reduced. This reduces the sensitivity of the comparators. Pulse counting continues, and if saturation occurs again the receiver sensitivity is decremented again.

A further feature of this embodiment is the use of a slow timer circuit to recover from saturation. A simple RC timing circuit 474 with a long time constant (e.g. 1 to 10 seconds) is used to periodically reset the current-source-control counter. This assures that the portable module will be able to rapidly recover from saturation.

Note that this embodiment requires at least one additional control line between the circuits which are now on the converter chip 220 and the circuits which are now on the receiver chip 210. This line can be added into these chip designs if needed, or alternatively the receiver and converter chips can be combined.

In a further modification of this alternative embodiment, two stages of gain reduction are used when saturation occurs. First, as just discussed, the receiver gain is decremented whenever the pulse counter saturates. However, after such decrement operations have reduced the gain so that the system is not overwhelmingly saturated, an additional small decrement is performed to optimize reception.

This can be implemented, for example, by using an additional threshold bit, to show when counter values exceed some intermediate value. This intermediate value would be chosen to reveal saturation problems—for example, it might be set slightly higher than the length which would be seen if the intersymbol separation for the longest legal two-symbol sequence were missed.

A further alternative way to implement the digital AGC function is using transistors to selectably switch out individual elements of a resistor ladder. In this further alternative embodiment, a constant current source is used for the comparator, instead of the adjustable current source just described. Gain control is performed by dynamically scaling the RF input voltage, using a digital feedback circuit as described above. For example, in the preferred version of this embodiment, the input A+ would not be connected directly to the + input of the comparator 420A, but instead would be connected through a high-impedance resistor ladder to the − input of the comparator 420A. A third terminal on this resistor ladder (i.e. a "wiper" terminal) would be connected to the + input of the comparator 420A. The counter outputs would be connected to control transistors which switch the individual elements of the resistor ladder in or out. (Preferably two resistor arrays would be used, one between the A+ input and the + terminal of the comparator, and one between the comparator's + and − terminals. The digital inputs would each be connected to two pass transistors.) This embodiment is illustrated in FIG. 4G. Note that the values of the resistor elements are scaled in multiples of 1.5, rather than in multiples of two. Preferably the total value of the resistance between A+ and A− is large enough not to greatly degrade the Q of the circuit; for example, a resistance.

The embodiment of FIG. 4G may be advantageous in providing a wider range of gain control. Since the gain of the comparator varies as the square root of the bias current, the current sources might have to be scaled over a wider range than is practical to achieve the desired sensitivity range.

These two embodiments of automatic gain control can also be combined. For example, some bits of the counter output can be routed to switch a resistor array to scale the input voltage, while other bits of the counter output (for example, the most significant bits) are routed to switch the current input to the comparator as discussed above.

ACCESS CONTROL CHIP 230

This integrated circuit, in the portable data module, implements addressing and security controls.

The access control chip 230, in the presently preferred embodiment, is a miniature security system which stores 64 bits of user definable identification code and a 64 bit password which protects 128 bits of read-/write nonvolatile memory. This security subsystem enables the access control chip 230 to act, in effect, as an electronic key. The 64-bit identification code and the password are programmed into the access control chip 230 via a special program mode operation. After programming, the access control chip 230 follows a special procedure with a serial format to retrieve or update data.

Interface cost to a microprocessor is minimized by on-chip circuitry which permits data transfer with only three signals: CLK (clock), RST* (reset complemented), and DQ (data input or output).

Low pin count and a guided entry for a mating receptacle overcomes mechanical problems normally encountered with conventional integrated circuit packaging, making the device transportable and user insertable.

OPERATION - NORMAL MODE

Figure 6A:
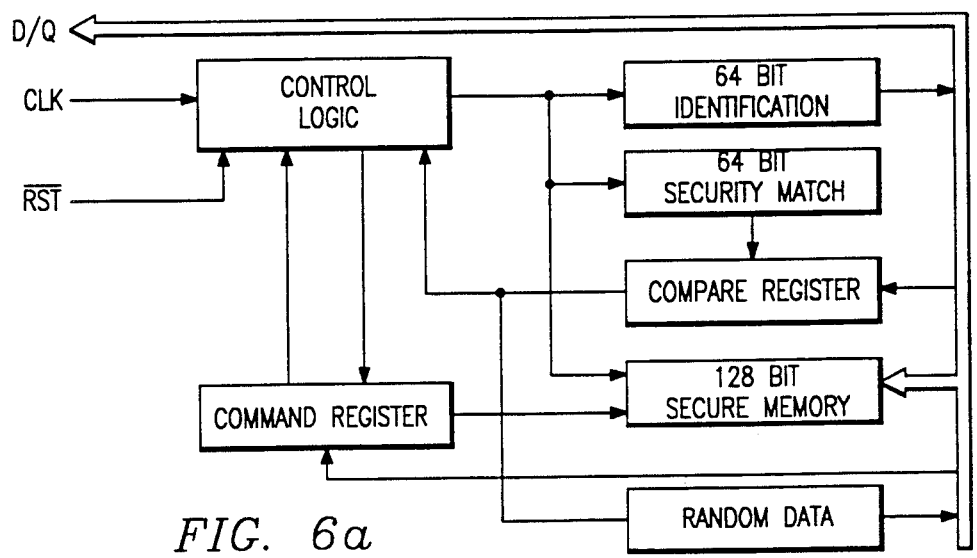
FIG. 6A is a block diagram of the access control chip used in the presently preferred embodiment, in its normal mode of operation.

The access control chip 230 has two modes of operation: the normal mode and the program mode. The block diagram (FIG. 6A) illustrates the main elements of the access control chip 230 when used in the normal mode. To initiate data transfer with the access control chip 230, RST* is taken high and 24 bits are loaded into the command register on each low to high transistion of the CLK input. The command register must match the exact bit pattern which defines normal operation for read or write or communications is ignored. If the command register is loaded properly, communications are allowed to continue. The next 64 cycles to the access control chip 230 are read. Data is clocked out of the access control chip 230 on the high to low transistion of the clock from the identification memory. Next, 64 write cycles must be written to the compare register. These 64 bits must match the exact pattern stored in the security match memory. If a match is not found, access to additional information is denied. Instead, random data is output for the next 128 cycles when reading data. If write cycles are being executed, the write cycles are ignored. If a match is found, access is permitted to a 128-bit read/write nonvolatile memory. FIG. 6B is a flow chart of the normal mode sequence.

PROGRAM MODE

The block diagram of FIG. 6C illustrates the main elements of the access control chip 230 when used in the program mode. Note that, preferably, any change of password will cause the data memory to be wiped. This enhances data security.

To initiate the program mode, RST* is driven high and 24 bits are loaded into the command register on each low to high transition of the CLK input. The command register must match the exact pattern which defines program operation. If an exact match is not found, the remainder of the program cycle is ignored. If the command register is properly loaded, the entire RAM (all 256 bits) is pulsed to all zeros. The next 128 bits received are written to the identification memory and the password memory. FIG. 6D is a flow chart of program mode operation.

COMMAND WORD

Each data transfer for the normal and program mode begins with a three byte command word. As defined, the first byte of the command word specifies whether the 128 bit nonvolatile memory will be written into or read. If any of the bits of the first byte of the command word fails to meet the exact pattern of read or write, the data transfer will be aborted.

For example, in the presently preferred embodiment, the 8 bit pattern for read is "01100010" (binary). The pattern for write is "10011101" (binary). The first two bits of the second byte of the command word specify whether the data transfer to follow is a program or normal cycle. The bit pattern for program is 0 in bit 0 and 1 in bit 1. The program mode can be selected only when the first byte of the command word specifies a write. If the program mode is specified and the first byte of the command word does not specify a write, data transfer will be aborted. The bit pattern which selects the normal mode of operation is 1 in bit 0 and 0 in bit 1. The other two possible combinations for the first two bits of byte 2 will cause data transfer to abort.

The remaining 6 bits of byte 2 and the first 7 bits of byte 3 form unique patterns, which allow multiple access control chips 230 to reside on a common bus. As such, each respective code pattern must be written exactly for a given device, or data transfer will abort. The bit pattern as defined by the user must be written exactly or data transfer will abort. The last bit of byte 3 of the command word must be written to logic 1 or data transfer will abort.

RESET AND CLOCK CONTROL

All data transfers are initiated by driving the RST* input high. The RST* input serves three functions. First, it turns on control logic which allows access to the command register for the command sequence. Second, the RST* signal provides a power source for the cycle to follow. To meet this requirement, a drive source for RST* of 2 mA at 3 Volts is required. However, if the $V_{cc}$ pin is connected to a 5 Volt supply which is within nominal limits, then RST* is not used as a source of power. In this case, input levels will revert to normal inputs with a drive current requirement of 500 microA. Third, the RST* signal provides a method of terminating data transfer.

A clock cycle is a sequence of a falling edge followed by a rising edge. For data inputs, the data must be valid during the rising edge of a clock cycle. Command bits and data bits are input on the rising edge of the clock and data bits are output on the falling edge of the clock. All data transfer terminates if the RST* pin is low and the DQ pin goes to a high impedance state. When data transfer to the access control chip 230 is terminated using RST*, the transition of RST* must occur while the clock is at high level, to avoid disturbing the last bit of data.

DUAL PORT MEMORY CONTROLLER 260

FIG. 2D shows how the memory controller chip 260 is used in an alternative embodiment of the portable module 120. However, the memory controller chip has capabilities which can be useful in a wide variety of embodiments, including system embodiments which are not closely analogous to that shown in FIG. 2D. The architecture and operation of this integrated circuit will now be described in detail.

The memory controller 260 is a dual-port memory controller, which permits three-wire serial port to interface to a bank of one or more byte wide static RAMs 262, yet maintains the existing byte wide port. Memory address space, in the presently preferred embodiment, of up to 512K can be addressed directly. (Therefore, a single controller 260, in the presently preferred embodiment, can provide dual-port interface to a bank of 512 kbytes of memory, e.g. 16 32K-by-8 SRAMs.) Arbitration between the serial and byte wide port is accomplished either by handshaking or by using predictable idle time as an access window. The serial port requires a six byte protocol to set up memory transfers. Cyclic Redundancy Check circuitry is included to monitor serial data transmission for error.

Of course, the disclosed architecture can readily be modified for use with by-9, by-4, by-16, or other memory organization if desired. If a wider memory organization than that built into the controller 260 is needed—e.g., in this example, if a by-16 organization is needed rather than by-8—the parallel ports of multiple controllers can easily be parallelled. In this case the serial port access would need to be multiplexed over the multiple controllers (either by additional controllers or otherwise), but the parallel system port could simply be split.

PIN DESCRIPTIONS

The presently preferred embodiment will be described with reference to the following pin and signal designations:

RST*: This pin provides a selection signal input to the serial port 705 (at serial port buffer 706). (In the presently preferred system embodiment, the serial port 705 is connected to the serial data bus 206 in portable module 120.) When RST* is low, all communications to the serial port are inhibited. When high, data is clocked into or out of the serial port.

CLK: The clock input signal is used to input or extract data from the three-wire serial port 705. A clock cycle is defined as a falling edge followed by a rising edge on this line. During read cycles, data is driven out onto the bus 206 after a falling edge. During write cycles, data is latched into the port on the rising edge.

DQ: This is the bidirectional data signal for the 3 wire serial port 705. Valid data will be read from the DQ line, while RST* is high, on the low to high transition of the CLK signal, if the data is stable on the DQ line with the proper setup and hold times.

DQE: The DQE output signal is active (high level) whenever the 3 wire serial port buffer 706 is driving the DQ line. Therefore, this pin will be high whenever data is being read from the controller 260. Otherwise it will be low, and the DQ line will be an input to the controller 260. (This can be implemented by using the DQE line to command the other DQ drivers on the bus to go to a high-impedance state.)

$A0_{Sys}-A18_{Sys}$: These are the lines of system address bus 701A. These 18-bit addresses can specify one of $2^{19}$ (524,288, frequently written as "512K") locations for access.

$A0_{RAM}-A18_{RAM}$: Addresses supplied to RAM, on RAM address bus 703A. These signals allow access to up to 512K bytes of RAM controlled by the memory controller 260. The addresses are either derived from the system address bus ($A0_{Sys}-A18_{Sys}$), or from the protocol and internal binary counter provided by the 3 wire serial port and associated timing circuits.

$D0_{Sys}-D7_{Sys}$: These are the lines of system data bus 701D. This bidirectional bus is used to carry data to and from the parallel system bus and RAM.

$D0_{RAM}-D7_{RAM}$: Data supplied to or read from RAM 262 on RAM data bus 703D. During write mode, this data is either derived from the system data bus ($D0_{Sys}-D7_{Sys}$) or from the protocol and data stream provided by the 3 wire serial port and associated timing circuits.

The system control lines 701C provide control inputs $CE_{Sys}$* (chip enable), $OE_{Sys}$* (output enable (read))(for transfer of data from RAM to the parallel system bus), and $WE_{Sys}$* (write enable). If the system parallel port 701 has access to RAM 262, these control lines will be translated into the corresponding signals $CE_{RAM}$*, $OE_{RAM}$*, and $WE_{RAM}$* on RAM control lines 703C. If the serial port 705 has access, these control signals will be derived from a 56-bit protocol provided by the 3 wire serial port and associated timing circuits.

$V_{cc}$: +5 Volt power for the memory controller 260 (2 pins).

GND: Ground for the memory controller 260 (2 pins).

OPERATION

Figure 7A:
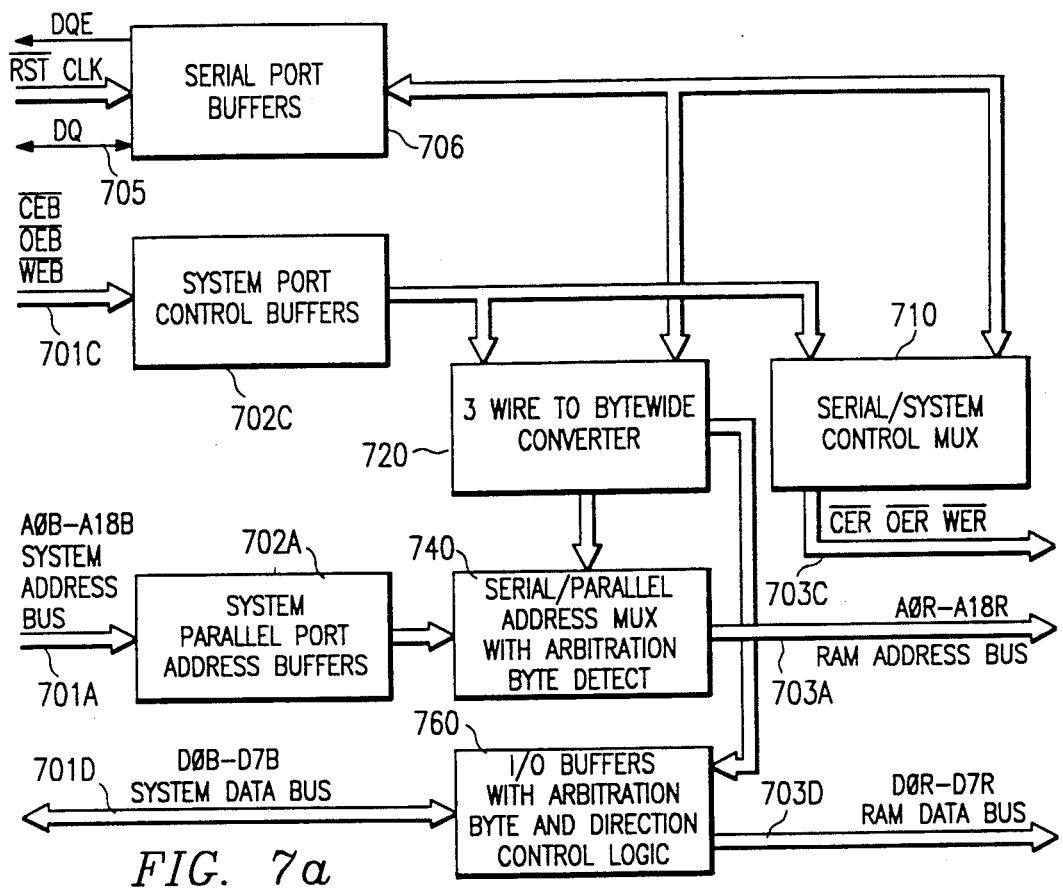
FIG. 7A shows an overall block diagram of the memory controller chip 260 which is used in the alternative remote module embodiment of FIG. 2D.

The block diagram of FIG. 7A illustrates the main elements of the memory controller 260. The memory controller 260 performs two major functions: serial to parallel conversion (in converter 720), and access arbitration between the two ports (the serial port and the parallel port). Access is arbitrated, between serial port 705 and byte-wide parallel port 701, by address multiplexer 740 and data multiplexer 760. Arbitration is preferably controlled by signals from the 3 wire to byte wide converter 720. The 3 wire serial port 705, has priority in accessing the RAM. Accesses through the parallel port 701 are expected to "steer around" accesses through the serial port 705.

INTERFACE TO SYSTEM (PARALLEL) BUS

If the RST* reset signal for the 3 wire serial port 705 is low (active), the byte wide parallel port 701 has immediate access to RAM 262. The system-derived control signals ($CE_{Sys}$*, $OE_{Sys}$*, and $WE_{Sys}$*) are buffered by the control signal buffer 702C and passed through by control line multiplexer 710, to provide $CE_{RAM}$*, $OE_{RAM}$*, and $WE_{RAM}$* respectively, which are connected directly to the control inputs of memory chip(s) 262. The byte wide parallel bus addresses ($A0_{Sys}-A18_{Sys}$) and control signals ($CE_{Sys}$*, $OE_{Sys}$*, and $WE_{Sys}$*) are buffered by the control signal buffer 702C, and passed through by the control line multiplexer 710 to provide outputs $A0_{RAM}-A18_{RAM}$, $CE_{RAM}$*, $OE_{RAM}$*, and $WE_{RAM}$* respectively, which are connected directly to the RAM memory chip(s) 262. The data input/output signals ($D0_{Sys}-D7_{Sys}$) are internally buffered and sent to RAM on the data input/output signals $D0_{RAM}-D7_{RAM}$. The buffering is designed to handle bidirectional data transfer. Data will be written from the byte wide parallel bus to RAM when $CE_{Sys}$* and $WE_{Sys}$* inputs are both active (low). The $OE_{Sys}$* signal is a "don't care" signal during a write cycle. Data is read from RAM via the byte wide parallel port when $CE_{Sys}$* and $OE_{Sys}$* signals are both low and $WE_{Sys}$* is high.

INTERFACE TO THREE-WIRE SERIAL BUS

If the RST* signal at the serial port 705 is high, the 3 wire to bytewide converter 720 takes control of the RAM, by switching the control/address/data multiplexers 710, 740, and 760. The converter 720 follows a 56-bit protocol, which is written serially from port 705, to determine the action required and also the starting address location in the RAM to be used. The last 8 bits of the 56 bit protocol give the value of a cyclic redundancy check byte (CRC). A correct value for this byte provides assurance that all bits of the 56-bit protocol have been received correctly. If the 56 bits of protocol have not been received correctly, further action will be aborted. The CRC check byte can detect up to three single bit errors within the 56 bit protocol, and can also be used on incoming and outgoing serial data streams to check the integrity of data being read or written.

COMMAND SET FOR INTERFACE TO SERIAL BUS

In the presently preferred embodiment, the serial bus protocol can cause the memory controller 260 to perform any of the following eight actions:

Protocol Commands

Figure 7C:
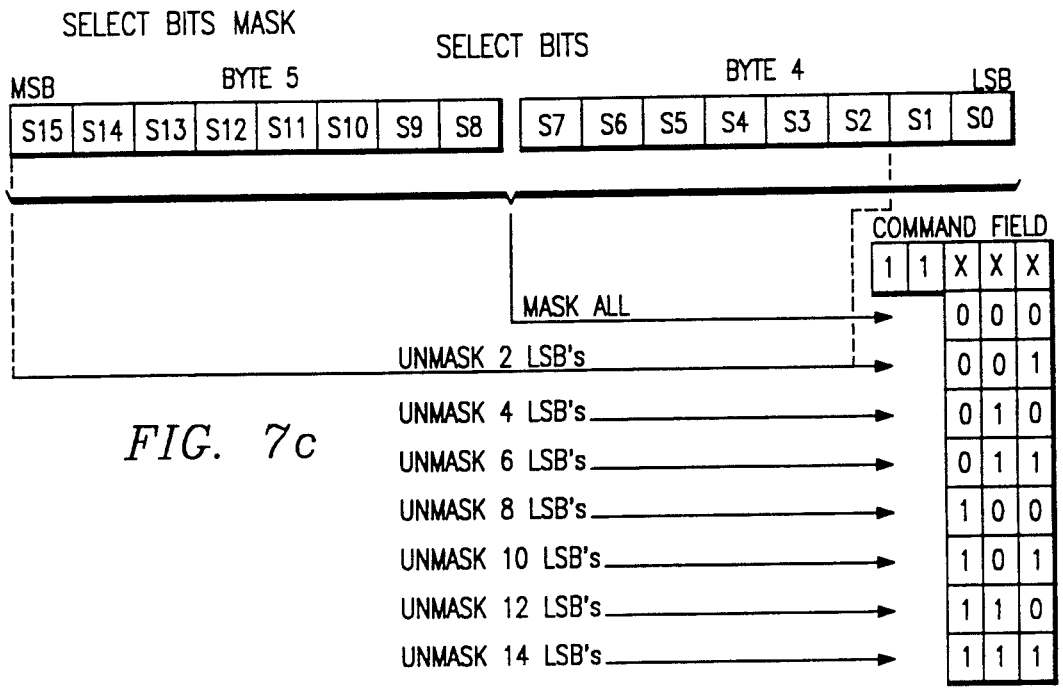
FIG. 7C shows the command structure for selectable masking of address bits in the memory controller chip 260.
Figure 7B:
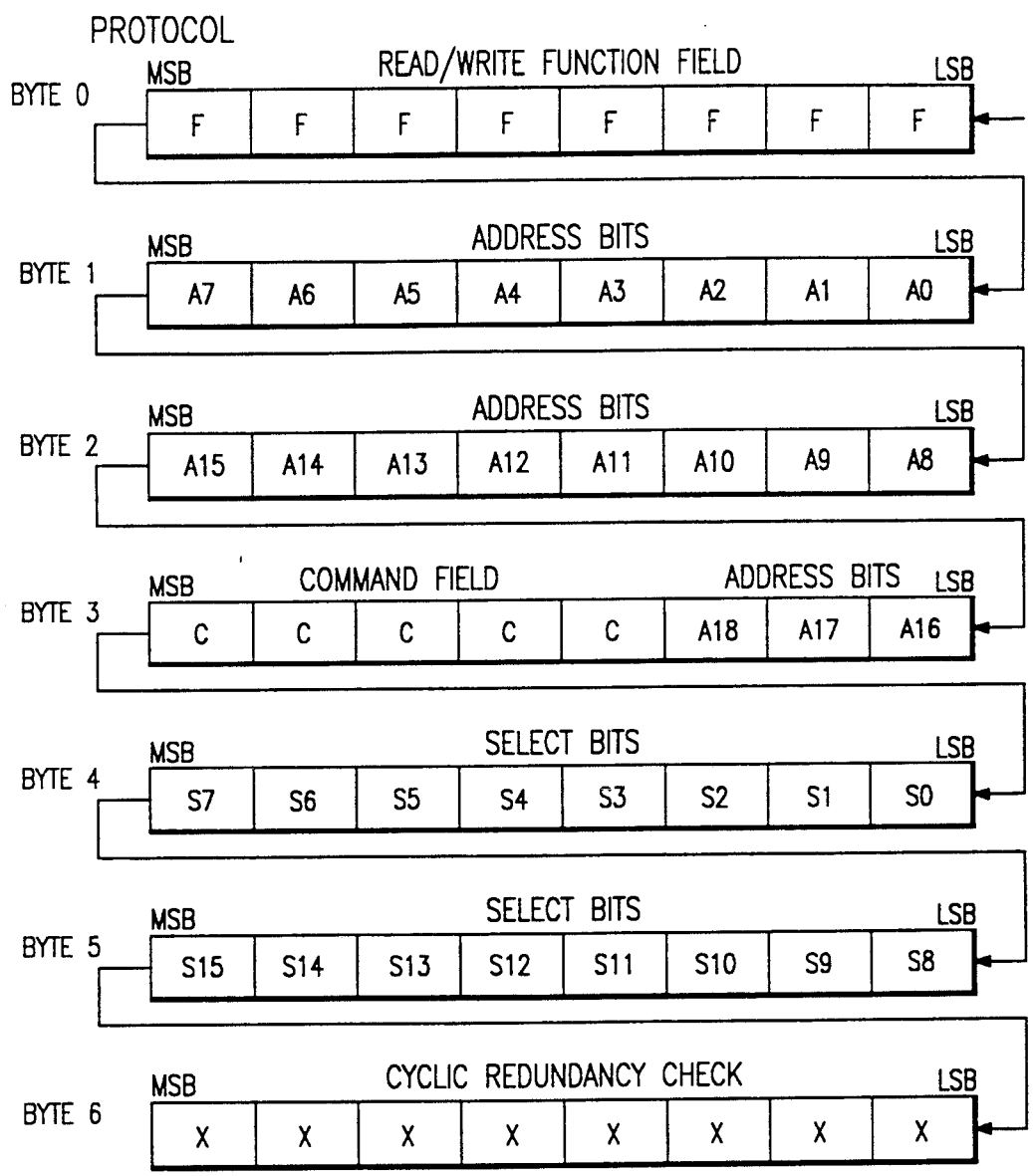
FIG. 7B shows the communication protocol preferably used in the memory controller chip 260.

1. Burst read
2. Burst write
3. Read protocol select bits
4. Write protocol select bits
5. Burst read masking portions of the protocol select bits
6. Read CRC register
7. Set the address arbitration byte location
8. Poll arbitration byte for status and control The organization of the 56 bit protocol is shown in FIG. 7B. As defined, the first byte of protocol determines whether the action which is to occur involves a read or write. A read function is defined by the binary pattern 11101000. This pattern, therefore, applies to commands 1, 3, 5, and 6 of Table 1. A write function is defined by the binary pattern 00010111. This pattern, therefore, applies to commands 2, 4, 7 and 8 of Table 1. Any other pattern which is entered into the read/write field will cause further action to terminate. (This provides further protection against transmission errors in the overhead bits.) Additional differentiation as to which read or write command is determined by the last five bits of the third byte of the protocol called the control field.

The control field bits, in the presently preferred embodiment, are as follows.

| | Control Field |
|---|---|
| Bits: | Command |
| 00110 | Burst read |
| 10001 | Burst write |
| 00011 | Read CRC register |
| 10110 | Set arbitration byte address to 00000 or 3FFFF |
| 01001 | Poll arbitration byte for access to RAM |
| 00101 | Read protocol select bits |
| 01110 | Write protocol select bits |
| 11XXX | Burst read masking portions of the select bits |

These commands are interpreted as follows:

A burst read uses a 19 bit address field (which includes the second and third bytes plus bits 0, 1, and 2 of the fourth byte) of the protocol to determine the starting address of information to be read from RAM. The byte of data resident in that location is loaded into the eight-bit shift register within the memory controller 260. The byte of data is then transferred from the shift register to the 3 wire bus by driving the DQ line on the falling edge of the next eight clocks with the LSB first.

A burst write uses the same 19 bit address field to determine the starting address of information to be written into RAM. Data is shifted from the DQ line of the 3 wire bus into an eight bit shift register within the memory controller 260 on the next eight rising clock edges. After a byte is loaded, the data is written into the RAM location immediately after the rising edge of the eighth clock.

Burst reads and writes will continue on a byte by byte basis, automatically incrementing the selected address by one location for each successive byte. Termination of a current operation will occur at any time when RST* is taken low. However, once a byte of data has been loaded into the shift register, the ongoing write cycle will be allowed to finish, even if RST* goes low during RAM write. This prevents corrupted data from being written into the RAM. If a full byte of data has not been loaded into the shift register when RST* goes low, no writing occurs. Reads can be terminated at any point, since there is no potential for corruption of data.

The read CRC command provides a method for checking the integrity of data sent over the 3 wire bus. The CRC byte resides in the last byte (Byte 6) of the protocol. The eight bit CRC byte not only operates on the protocol bits as they are written in, but also on all data that is written or read from RAM. After a burst read or write has finished and RST* has gone low, the final value of the CRC is stored in the memory controller 260. If a read CRC register command is issued, the stored CRC value is driven onto the D/Q line by the first eight clock cycles after the protocol is received. The CRC value generated by the memory controller 260 should match exactly with the value generated in the host system which is transmitting or receiving data on the other end of the 3 wire bus. If it does not, data has been corrupted and retransmission should occur.

It should be noted that the CRC for a previous transaction can only be obtained if a read CRC command is issued immediately after RST* goes low to reset the memory controller 260, then high to accept a read CRC command. If any other sequence is followed, an intermediate CRC will be generated and stored whenever RST* goes low again, destroying the CRC value of interest.

In any two port system there is a potential for access collisions. To solve this problem, an arbitration byte is provided so that the serial and parallel ports of the memory controller 260 can determine the status of the other port. A special byte in RAM address space is reserved to allow for handshaking between the two ports. This arbitration byte has a special attribute in that it is simultaneously accessible by both ports. Two commands are used by the 3 wire serial port protocol to manage the arbitration byte. First, since this byte will create a hole in RAM address space for the parallel byte wide port, a command is added to move the arbitration byte to either address location "00000" or address location "3FFFF". When setting the arbitration byte address location, the correct read/write field and command field must be entered, along with a value for bit A0 of the address field. (A 0 moves the arbitration byte to 00000, and a 1 moves it to 3FFFF.) It is important to note that the arbitration byte is located in the parallel memory location assigned by the serial port using the appropriate commands. However, the physical byte of RAM is located within the memory controller 260. The existence of this physical byte is transparent to the byte-wide parallel port and looks like normal RAM space with some write restriction. However, the serial port can still address the actual RAM location at either 00000 or 3FFFF in addition to accessing the arbitration byte. The second command used by the 3 wire serial port provides for polling of the arbitration byte to determine the status of the parallel port. In addition, the arbitration byte can be set to indicate to the parallel port at the serial port is taking over the RAM.

The second command protocol allows the serial port to do a compressed read-write-read operation, which causes the arbitration byte to be read by the first eight clocks following the protocol. The next eight clocks cause data to be written into the arbitration byte, and the last eight clock cycles allow for a second read of the data for verification. These 24 cycles are initiated by entering the 56 bit protocol only once. The protocol pattern entered is a write function in the read/write field (00010111), and the correct control field.

Two other commands are used to access the select bits in the protocol. Once the select bits are set to binary values, they must be matched exactly when protocol is sent by further activity is prevented. The bits allow for 65,536 different binary combinations. Therefore, many memory controllers can be connected on the same serial bus, and only the appropriate device will respond. To write the select bits, a write cycle in the read/write field is required along with the appropriate command in the command field. To read the select bits, a read cycle in the read/write field is required along with the appropriate command in the command field. The arrangement of reading and writing select bits allows the user to have a large number of memory controllers in use and uniquely identify each. A read can occur successfully without knowing the select bits but a write cannot occur without matching the current select field.

A third command, masking specific select bits, provides a means for determining the identify of specific memory controllers in the presence of many memory controllers. A read in the read/write field and a "11000" in the command field will execute a burst (masked) read. This operation ignores all select bits, to permit a base station 110 to quickly determine the presence of any memory controllers. With the detection of at least one device, a search can begin by masking all but a single pair of memory controller select bits. A read in the read/write field and a "11001" in the command field will unmask the first two LSBs of byte 4 of the select bits (FIG. 7C). With these two select bits unmasked, only an exact match of four possible combinations (00,01,10,11) of these two select bits will now allow access through the 3 wire port to RAM. Therefore, repeating the unmasking of the first two bits of the select field up to four times will give the binary value of these select bits. Having determined the first two select bits, the next two select bits can be unmasked, and the process of matching one of four combinations can proceed as before. In fact, repetition of unmasking select bit pairs will yield an exact match of 65,536 possible memory controllers in no more than 32 attempts.

ARBITRATION

As mentioned earlier, one byte of RAM has been reserved for arbitration between the 3 wire port and the bytewide parallel bus. The location of this byte within the memory map will be at address 00000 or at address 3FFFF (as determined by the protocol input from the 3 wire serial port).

Figure 7D:
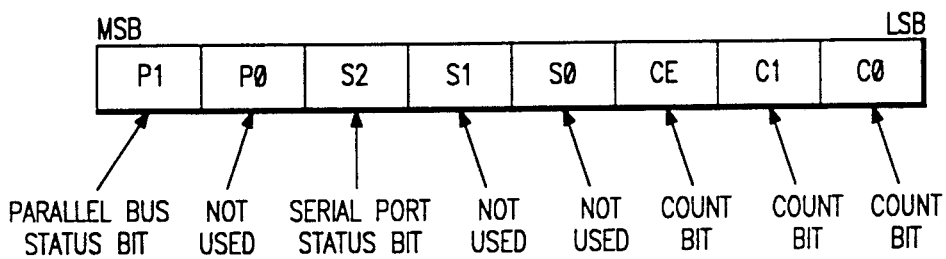
FIG. 7D shows the format of the arbitration byte preferably used to arbitrate between the two ports which may seek access to memory, through controller 260.

The arbitration byte has special restrictions and disciplines so that the 3 wire serial bus and the bytewide parallel bus are never in contention for RAM access. The format of this byte, in the presently preferred embodiment, is shown in FIG. 7D. In this embodiment, the serial port 705 can read the whole arbitration byte, but can only write bits S2-SO. The parallel port 701 can read the whole byte, but can only write bits P1-P0. An internal counter controls count bits C2-C0, which cannot be written by either port.

To access memory, in this scheme, the ports read the status bits, and write the bits over which they have control. If the serial port wants to access RAM, it polls the arbitration byte until bit P1 equals zero (indicating that the parallel port is not engaged in access). When P1 equals zero, the serial port then writes a one into bit S2. After writing bit S2, the serial port then reads the arbitration byte again, to confirm that P1=0 and S2=1. This operation must be executed with the protocol for the compressed read-write-read sequence which minimizes overhead. The 3 wire serial port should always abort any attempt to access RAM if P1 equals one. When the 3 wire serial port completes any transfer of data to or from RAM, Bit S2 should be written back to zero so that the bytewide parallel port will know that the 3 wire serial port is not using the RAM. The bytewide serial bus can gain access to RAM by polling the arbitration byte until S2 bit equals zero. When S2 equals zero, the bytewide parallel port then writes a one into bit P1. A read cycle verifying that S2 equals zero and P1 equals one confirms that the bytewide parallel port has access to RAM. The bytewide parallel port can then read or write RAM as required. When the entire transaction is complete, the bytewide parallel port should write the P1 bit to zero, signalling the 3 wire serial port that the RAM is not in use. The bits B0, S1, and S0 can be defined by the user definition to pass additional arbitration information making possible more elaborate handshaking schemes between two ports. Some typical uses for these bits could be an indication that a port desires access to RAM, or the amount of RAM.

An alternative method of arbitration can also be followed. In this alternative method, arbitration is accomplished by use of the count bits C0-C2. Due to the overhead protocol used for accesses on the serial bus 705, the serial port cannot read or write from RAM more often than once in every eight clock cycles. Moreover, the internal counter (which is updated whenever another byte is loaded into the internal serial buffer) is organized so that it is certain that serial port accesses will only occur when the counter transitions from a "111" state to a "000" state. The serial port has access on these clock cycles, and the parallel port has access at all other times, regardless of the arbitration byte status bits. Since the 3 wire port always reads or writes at the ends of a byte (when bits C0-C2 are all equal to 1), the software which controls the bytewide parallel bus is never allowed to access the bytewide RAM bus at these times (when the count bits are all ones). The parallel port can determine the minimum time left before the 3 wire serial port will access the memory, by reading the count bits and the minimum clock cycle applied to the 3 wire clock input. Essentially the 3 wire serial port is given priority on access to RAM, and the bytewide parallel port determines when it can access the RAM to avoid colliding with the 3 wire serial port.

CRC GENERATION

Figure 7E:
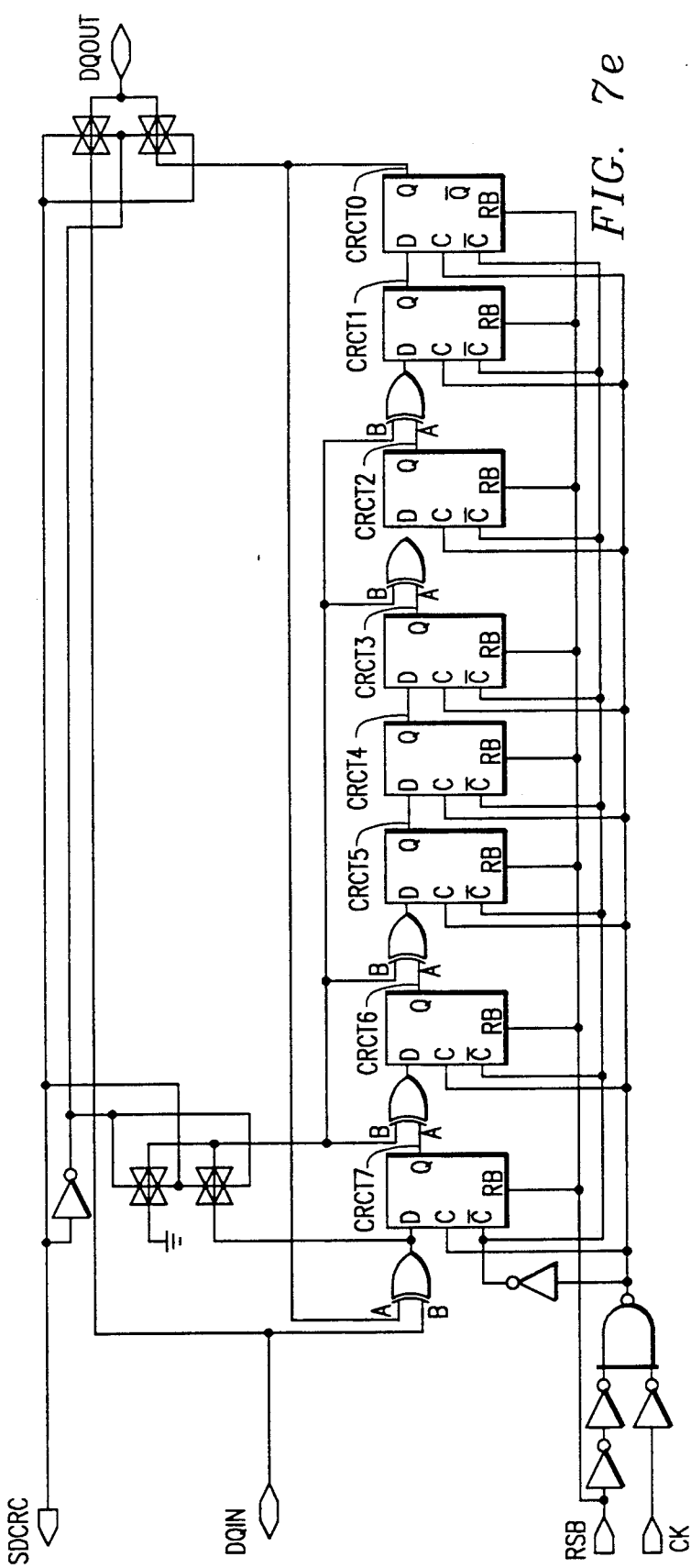
FIG. 7E shows the logic used, in the presently preferred embodiment, to generate the cyclic redundancy check (CRC) data.

The cyclic redundancy check byte is generated, within the controller 260, by a conventional configuration. In the presently preferred embodiment, as shown in FIG. 7E, this logic includes an eight bit shift register, four exclusive-OR gates, and two sets of transmission gates. The transmission gates are connected so that the CRC Generator monitors the data stream from the DQ pin, and continually updates its internal parameters, without disrupting the serial data flow. The reset signal (RST*) must be high while the CRC Generator is being used, since an inactive state will disable the eight bit shift registers.

A CRC Generator for serial port communications can be constructed as described above to satisfy the memory controller CRC requirements. However, another approach is to generate the CRC using software.

ANALYSIS OF POWER EFFICIENCY

The portable module is a low power device capable of operating on one battery for ten years. The power dissipation of the portable module falls into two main categories: DC listening (or quiescent) power dissipation, and transient transaction power dissipation. "DC listening power dissipation" refers to the current used by receiver chip 210 to continuously monitor for the presence of a signal delivered to it by the receiving antenna network. The input comparator of receiver chip 210 operates with a current of 1.5 microA. In ten years this will consume a charge of:

$$Q_{DC} = 10 \text{ yr} \times 365 \text{ day/year} \times 24 \text{ hr/day} \times 0.0015 \text{ mA}$$
$$= 131.4 \text{ mA-hr} = 471 \text{ Coulombs } (C).$$

This charge is the majority of the 190 mA-hr that the battery used in the presently preferred system embodiment can supply. The 58.6 mA-hr that is left can be used for data transfers to and from the portable module-referred to above as transient transaction power dissipation. The charge used by the portable module in data transfers is listed below.

Some charge is used by receiver chip 210 and converter chip 220 in amplifying and interpreting pulse packets. This charge is referred to below as $CVF_{210+220}$ and refers to the charge used to move the voltage on the capacitances in the chip. The total of the charge consumption of the two chips has been measured to be 25 pC/input pulse.

The oscillator in converter chip 220 that provides the 5 kHz modulation of the 300 MHz transmitter burns 20 microA when active. The converter chip 220, in the presently preferred embodiment, actually divides down an 80 kHz oscillator output to 5 kHz. A contemplated improvement will replace the 80 kHz oscillator with a 20 kHz oscillator, reducing the current by a factor of four to 5 microA.

The 300 MHz transmitter burns 120 microA when on.

As with receiver chip 210 and converter chip 220, there is charge used to move the capacitances in access control chip 230. This is referred to as $CVF_{230}$ in the table below, and has a value of 25 pC/bit.

The RAM in access control chip 230 burns 500 microA when it is active. Converter chip 220 activates the RAM for 500 nsec when it accesses access control chip 230. This causes a charge consumption of 500 nsec × 500 microA = 250 pC/bit when the RAM is accessed. In a contemplated revision, the RAM sensing scheme will be redesigned to reduce this value to 25 pC/bit.

Whenever the RST* pin of access control chip 230 is high, access control chip 230 will sink 250 microA from it. (In a contemplated revision of access control chip 230 this value will be reduced to zero.)

| Charge consumption components of portable module | | |
|---|---|---|
| Component | Present Design | Contemplated Revision |
| $CVF_{210+220}$ | 25 pC/input pulse | 25 pc/input pulse |
| Beacon oscillator | 20 microA | 5 microA |
| 300 MHz transmit | 120 microA | 120 microA |
| $CVF_{230}$ | 25 pC/bit | 25 pC/bit |
| RAM-acc$_{230}$ | 250 pC/bit | 25 pC/bit |
| standby$_{230}$ | 250 microA | 0 microA. |

To show how to use the component values in this table, a calculation of the charge used in a typical transaction follows. The transaction analyzed will consist of the following steps:
1) Wake up module 1
2) Send beacon protocol
3) Scan for beacon
4) Turn off beacon
5) Send protocol for access control chip 230
6) Data transaction with ID, password, and memory fields
7) Put module 1 to sleep.

After a calculation of charge used at each step, a table will summarize the results.

Step 1: Wake up module 1

To wake up module 1, 24 bits (16 bits of chip select and 8 bits of command) must be sent to converter chip 220. Assuming the data sent is 50% "1" bits and 50% "0" bits, and that the pulse packet sizes are 10 and 20 for a 0 and a 1 respectively this results in a charge consumption of:

$$Q = (12 \times 10 + 12 \times 20) \text{pulses} \times 25 \text{ pC/pulse}$$
$$= 9 \text{ nC.}$$

Step 2: Send beacon protocol

The beacon is enabled (turned on) by sending pulse packets of length 50, 40, 10, and 20. This results in a charge consumption of:

$$Q = (50 + 40 + 10 + 20) \text{pulses} \times 25 \text{ pC/pulse}$$
$$= 3 \text{ nC.}$$

Step 3: Scan for beacon

In the present embodiment of the converter chip 220, 20 microA is burned when the beacon oscillator is running. The 300 MHz transmitter will burn 120 microA at a 50% duty cycle for an average current burn of 60 microA. Converter chip 220 and the 300 MHz transmitter thus burn a total of 80 microA when the beacon is operating. The scan time for module 1 will be estimated in this example to be that required to take 25 steps of 40 kHz each with a dwell time of 0.3 msec per step. This time is 25 × 0.3 msec = 7.5 msec. Thus the charge consumed is:

$$Q = 7.5 \text{ msec} \times 80 \text{ microA}$$
$$= 600 \text{ nC.}$$

In a contemplated modification of the converter chip, the beacon oscillator current will be reduced from 20 microA to 5 microA. When added to the 60 microA of transmitter current this gives a total current drain of 65 microA. Also, it is planned to increase the beacon frequency to 20 kHz. This reduces the dwell time at each frequency step to be 0.3 msec/4 = 0.075 msec and speeds up the scan by a factor of four. The bandwidth of the receiver is also planned to be increased, thus decreasing the number of steps required. However, for this example the number of steps will be kept at 25. This results in a scan time of 25 × 0.075 msec = 1.875 msec which results in an improved charge consumption of:

$$Q = 1.875 \text{ msec} \times 65 \text{ microA}$$
$$= 122 \text{ nC.}$$

Step 4: Turn off beacon

Turning off the beacon requires sending a pulse packet of length 30. This causes a charge consumption of:

$$Q = 30 \text{ pulses} \times 25 \text{ pC/pulse}$$
$$= 0.75 \text{ nC.}$$

Step 5: Send access control protocol

The access control protocol is 24 bits long. Assuming a 50% density of "1" bits, as in step 1, receiver chip 210 and converter chip 220 will consume 9 nC as in step 1.

In addition, access control chip 230 will consume 25pC/bit (RAM is not activated) and the RST* line being high will burn 250 microA for the length of the transmission. Assuming a 5 kHz data rate, the transmission will last 24×0.2 msec=4.8 msec. The total charge consumption will be:

$$Q = 9 \ nC + (24 \ bits \times 25 \ pC/bit) +$$
$$(250 \ microA \times 4.8 \ msec)$$
$$= 9 \ nC + 0.6 \ nC + 1200 \ nC$$
$$= 1209.6 \ nC.$$

In a contemplated modification, access control chip 230 will not draw current from the RST* line, thereby removing the 250 microA×4.8 msec component of charge above. The new design's total charge consumption will be:

$$Q = 9 \ nC + 0.6 \ nC$$
$$= 9.6 \ nC.$$

Step 6: Data transaction with access control chip 230

The combined number of bits sent to/from these fields is 256. Assuming a 50% 1's density, and the use of 10 and 20 pulses for a 0 and a 1 respectively, receiver chip 210 and converter chip 220 will consume 128×(10+20)×25 pC=96 nC. Access control chip 230 will consume 256×25 pC=6.4 nC of CVF charge and 256×250 pC=64 nC of RAM access charge. The RST* line will cause a current burn of 250 microA for 256×0.2 msec (at an assumed 5 kHz data rate)=12,800 nC. The combined length of the ID and memory fields is 192 bits. Assuming a 50% 1's density and that the 300 MHz transmitter is on for 200 microsec per bit, this results in a charge consumption by the 300 MHz transmitter of 192×50% ×200 microsec×120 microA=2304 nC. Thus the total charge consumption is:

$$Q = 96 \ nC + 6.4 \ nC + 64 \ nC + 12,800 \ nC + 2304 \ nC$$
$$= 15,270.4 \ nC.$$

In a contemplated modification, access control chip 230 will reduce the RAM access charge to 256×25 pC=6.4 nC from 64 nC. Access control chip 230 will reduce the 12,800 nC of RST* charge consumption to 0 nC. This will improve the total charge consumption to:

$$Q = 96 \ nC + 6.4 \ nC + 6.4 \ nC + 0 \ nC + 2304 \ nC$$
$$= 2,412.8 \ nC.$$

Step 7: Put module 1 to sleep

This is a 24 bit protocol sent to converter chip 220 which results in a charge consumption equal to that in step 1:

Q=9 nC.

The results of these calculations are as follows:

| Charge consumption of example transaction | | |
|---|---|---|
| Step | Present Design | Contemplated Design |
| Wake up module | 9 nC | 9 nC |
| Send beacon prot | 3 nC | 3 nC |
| Scan for beacon | 600 nC | 122 nC |
| Turn off beacon | 0.75 nC | 0.75 nC |
| Send access control bits | 1209.6 nC | 9.6 nC |
| Data transaction | 15270.4 nC | 2412.8 nC |
| Module to sleep | 9 nC | 9 nC |
| Total | 17101.7 nC | 2566.1 nC |

Thus, the total charge used in the example transaction is 17,101.7 nC, using the present design, and 2,566.1 nC using the new design. This transaction is merely an example, which shows how the total charge consumption of a transaction can be calculated. Moreover, this calculation gives some indication of the number of transactions, of this type, that could be performed within the available battery lifetime.

Of the 190 mA-hr in the battery, 58.6 mA-hr is available for transactions. Dividing the charge used per transaction into 58.6 mA-hr yields 12.3 million transactions for the present portable module (and 82.2 million transactions with modifications as set out above). By far the largest charge consumer in the present design is the RST* current to access control chip 230 in standby mode, followed by the use of the 300 MHz transmitter to send data. Thus, a rough (but conservative) worst case estimate would be at least one million worst case transactions out of the portable module. This is 100,000 transactions per year, or 274 transactions per day.

FURTHER MODIFICATIONS AND VARIATIONS

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

Of course, the particular frequencies used for communication can be widely modified and varied. For example, the "freshness seal" frequency could be given a wide range of values other than 2 kHz. For another example, the write-data frequency is preferably 200 kHz (as described) for North American applications; but for European applications, this frequency is preferably set to about 132 kHz instead.

The disclosed innovative teachings can also be applied to implement more complex filter functions. For example, by using combinations of bandpass filters like those of the principal preferred embodiment, circuits can readily be configured to detect signals with energy either in band A or in band B; or to detect only signals with energy in both band A and band B.

Moreover, more complex logic gates can optionally be used instead of the two inverters of the presently preferred embodiment. For example, by substituting an AND gate for an inverter, a joint-timing relationship can be implemented, where one signal is gated by another. Similarly, by substituting XOR gates, a different combined relationship can be imposed.

As will be recognized by those skilled in the art, the innovative concepts described in the present application can be modified and varied over a tremendous range of applications, and accordingly their scope is not limited except by the allowed claims.

What is claimed is:

1. An integrated circuit bandpass filter, for providing a passband with predetermined upper and lower passband edge frequencies, comprising:

a first digital circuit which has an input and an output, said first circuit outputting a signal made from delaying by a first time interval first polarity transitions of an input signal but not delaying transitions of polarity opposite said first polarity wherein said first circuit outputs a constant signal if said delayed first polarity transitions overlap said not delayed opposite polarity transitions;

a second digital circuit which has an input and an output, said second circuit outputting a signal made from delaying by a first time interval second polarity transitions of an input signal but not delaying transitions of polarity opposite said second polarity wherein said first circuit outputs a constant signal if said delayed second polarity transitions overlap said not delayed opposite polarity transitions;

the output of said second circuit connected to the input of said first circuit;

a digital counter circuit, having reset and clock inputs, and having a count output which is determined in accordance with said clock and reset inputs;

wherein the output of said first digital circuit is connected to drive said reset input of said counter, and the output of said second digital circuit is connected to drive said clock input of said counter;

whereby said count output of said counter provides said bandpass filter function for signals at said input of said second circuit.

2. The integrated circuit of claim 1, wherein said first digital circuit is an inverter.

3. The integrated circuit of claim 1, wherein said second digital circuit is an inverter.

4. The integrated circuit of claim 1, wherein said first and second digital circuits are inverters, and further comprising a capacitor connected in parallel with the output of said first digital circuit.

5. The integrated circuit of claim 1, wherein said first and second digital circuits are inverters, and further comprising a resistor connected in series with the output of said first digital circuit.

6. The integrated circuit of claim 1, wherein said first and second digital circuits are inverters, and wherein the input to said first digital circuit has a longer RC time constant than does the input to said second digital circuit.

7. The filter of claim 1, wherein:
   said first polarity transitions are high to low transitions; and
   said second polarity transitions are high to low transitions.

8. The filter of claim 1, wherein:
   said first time interval is less than said second time interval.

* * * * *